United States Patent
Fukawa et al.

(10) Patent No.: US 8,218,671 B2
(45) Date of Patent: Jul. 10, 2012

(54) RECEIVING APPARATUS, RECEIVING METHOD AND COMMUNICATION SYSTEM

(75) Inventors: Kazuhiko Fukawa, Tokyo (JP); Hiroshi Suzuki, Tokyo (JP); Satoshi Suyama, Tokyo (JP); Ryota Yamada, Osaka (JP); Naoki Okamoto, Osaka (JP)

(73) Assignees: Tokyo Institute of Technology, Tokyo (JP); Sharp Kabushiki Kaisha, Osaka (JP)

( * ) Notice: Subject to any disclaimer, the term of this patent is extended or adjusted under 35 U.S.C. 154(b) by 157 days.

(21) Appl. No.: 12/866,175

(22) PCT Filed: Feb. 4, 2009

(86) PCT No.: PCT/JP2009/051878
§ 371 (c)(1),
(2), (4) Date: Aug. 4, 2010

(87) PCT Pub. No.: WO2009/099097
PCT Pub. Date: Aug. 13, 2009

(65) Prior Publication Data
US 2010/0316151 A1    Dec. 16, 2010

(30) Foreign Application Priority Data
Feb. 5, 2008   (JP) .................................. 2008-025604

(51) Int. Cl.
*H04B 7/02* (2006.01)
*H04L 1/02* (2006.01)

(52) U.S. Cl. ........ 375/267; 375/260; 375/262; 375/341; 375/347; 375/349

(58) Field of Classification Search .................. 375/260, 375/262, 267, 299, 341, 347, 349
See application file for complete search history.

(56) References Cited

U.S. PATENT DOCUMENTS
2008/0279299 A1* 11/2008 Reuven et al. ................ 375/267
2009/0060078 A1*  3/2009 van Zelst et al. ............. 375/262

FOREIGN PATENT DOCUMENTS
JP        2007-300586 A      11/2007

OTHER PUBLICATIONS
Haykin, Simon, "Adaptive Filter Theory, Third Edition," Prentice Hall, NJ, USA, pp. 194-206, 1996.

(Continued)

*Primary Examiner* — Curtis Odom
(74) *Attorney, Agent, or Firm* — Birch, Stewart, Kolasch & Birch, LLP

(57) ABSTRACT

To obtain excellent reception performance while cutting down the amount of computing operation in a MIMO communication system using soft-decision error correction coding. Received waves picked up by receiving antennas 401-1 to 401-R are converted from the radio frequency to the baseband signal by respective receivers 402-1 to 402-R to be output as a received signal. A signal detector 403 calculates bit LLRs of the transmitted signal based on the received signal and the channel-estimated values obtained from a channel estimator 404. The bit LLRs output from signal detector 403 are rearranged by deinterleaver units 405-1 to 405-T in the patterns opposite to the patterns in which interleaving was performed on the transmission side. The bit LLRs after de-interleaving are subjected to an error correction decoding process through decoders 406-1 to 406-T. The bit sequences after decoding are parallel-to-serial converted by a parallel-to-serial converter 407 so that the detected transmission bit sequence is output.

18 Claims, 19 Drawing Sheets

OTHER PUBLICATIONS

Khine, Thet Htun et al., "Suboptimal Algorithm of MLD Using Gradient Signal Search in Direction of Noise Enhancement for MIMO Channels," IEICE Transactions on Communications, vol. E90-B, No. 6, pp. 1424-1432, Jun. 2007.

Rupp, Markus et al., "Approximate ML Detection for MIMO Systems with Very Low Complexity," Proceedings of ICASSP, pp. IV-809-IV-812, May 17-21, 2004.

Woo, Jooin et al. "Algorithm to Calaulate Bit Sequence Log Likelihood Ratio for Coded MIMO-OFDM Suboptimal Detection," IEICE Technical Report, The Institute of Electronics, Information and Communication Engineers, pp. 275-280, Feb. 27, 2008.

Zhu, Xu et al., "Performance Analysis of Maximum Likelihood Detection in a MIMO Antenna System," IEEE Transactions on Commmunications, vol. 50, No. 2, pp. 187-191, Feb. 2002.

* cited by examiner

RECEIVING APPARATUS, RECEIVING METHOD AND COMMUNICATION SYSTEM

TECHNICAL FIELD

The present invention relates to a receiving apparatus, receiving method and communication system for performing communication in a MIMO system.

BACKGROUND ART

In radio communications such as mobile telephony system and the like, as a technology for enhancing the transmission speed without widening the frequency bandwidth, MIMO (Multiple Input Multiple Output) transmission for performing spatial multiplexing transmission using a plurality of transmitting and receiving antennas has been known.

FIG. 18 is a block diagram showing a configuration of a transmitting apparatus for MIMO transmission. The transmitting apparatus includes a serial-to-parallel converter 5001, modulators 5002-1 to 5002-T, transmitters 5003-1 to 5003-T and transmitting antennas 5004-1 to 5004-T.

To begin with, a transmission bit sequence is serial-to-parallel converted by serial-to-parallel converter 5001 so as to be divided into T bit sequences. The bit sequences are mapped on modulation symbols such as QPSK (Quadrature Phase Shift Keying), 16QAM (Quadrature Amplitude Modulation) by associated modulators 5002-1 to 5002-T. The modulation symbols, as the transmitted signal, are converted into radio frequency through transmitters 5003-1 to 5003-T and transmitted at an identical frequency at the same timing from associated transmitting antennas 5004-1 to 5004-T.

FIG. 19 is a block diagram showing a configuration of a receiving apparatus for MIMO transmission. The receiving apparatus includes receiving antennas 5101-1 to 5101-R, receivers 5102-1 to 5102-R, a signal detector 5103 and a channel estimator 5104.

Receiving antennas 5101-1 to 5101-R receive the transmitted signal in a spatially multiplexed form. The received waves picked up by receiving antennas 5101-1 to 5101-R are converted from the radio frequency to the baseband by respective receivers 5102-1 to 5102-R to be output as received signals. Signal detector 5103 detects the transmitted signal based on the received signal and channel-estimated values obtained from channel estimator 5104 and outputs decision value of the transmission bit sequence. Channel estimator 5104 estimates impulse response of a transmission channel, based on a known training signal for channel estimation and the received signal.

Signal detector 5103 detects individual transmitted signals from the received signal that is given in a spatially multiplexed forms of the transmitted signal. As an optimal detecting scheme, MLD (Maximum Likelihood Detection) is used. First, the received signal is represented as follows:

[Math 1]

$$y = Hs + n \tag{1}$$

$$y = [y_1 \wedge y_R]^T \tag{2}$$

$$H = \begin{pmatrix} h_{11} & \wedge & h_{1T} \\ M & O & M \\ h_{R1} & \wedge & h_{RT} \end{pmatrix} \tag{3}$$

$$s = [s_1 \wedge s_T]^T \tag{4}$$

$$n = [n_1 \wedge n_R]^T \tag{5}$$

Here, y is an R-dimensional received signal vector having as its components the received signals that have been received at individual antennas, H is a R-row, T-column channel matrix having as its elements the channel impulse responses between the transmitting antennas and receiving antennas, s is a T-dimensional transmitted signal vector having as its components the transmitted signals that have been transmitted from individual antennas, and n is a R-dimensional noise vector having as its components noises at individual receiving antennas. The superscript "$T$" denotes transpose of a matrix. MLD detects the transmitted signal based on the received signal, channel-estimated values and transmitted signal candidates, following the criterion below

[Math 2]

$$\tilde{s} = \underset{\hat{s}}{\mathrm{argmin}} \|y - \tilde{H}\hat{s}\|^2 \tag{6}$$

Here, s is a detected T-dimensional transmitted signal vector, $\tilde{H}$ is a R-row, T-column channel estimate matrix having as its component estimated channel impulse responses, $\hat{s}$ is the candidates of the transmitted signal. $\hat{s}$ involves all the signal patterns transmitted on the transmitting side. In MLD, based on the transmitted signal candidate that is closest to the received signal or that minimizes the metric:

[Math 3]

$$\|y - \tilde{H}\hat{s}\|^2,$$

from all the candidates of the transmitted signal, the transmission bits are determined so as to be output as the decision value.

In this way, since in MLD, as many metrics as the number of all the transmitted signal candidates are calculated, it is possible to obtain the optimal performance, but this method poses a problem that the amount of computing operation becomes huge. Concerning MLD, there is a description in Non-patent Document 1 mentioned hereinbelow.

As the second-to-best detecting scheme that can cut down the amount of computing operation, there exist linear reception schemes such as ZF (Zero Forcing), MMSE (Minimum Mean Square Error), for example. A linear reception scheme is carried out by multiplying the received signal by a T-row, R-column weight coefficient matrix, as follows:

[Math 4]

$$\hat{x} = Wy \tag{7}$$

The weight coefficient matrix W is given as

[Math 5]

$$W = (\tilde{H}^H \tilde{H})^{-1} \tilde{H}^H \tag{8}$$

on the ZF basis, and the matrix is given as

[Math 6]

$$W = (\tilde{H}^H \tilde{H} + \sigma_n^2 I^T)^{-1} \tilde{H}^H \tag{9}$$

on the MMSE basis.

Here, $^H$ represents a complex conjugate transposed matrix, $\sigma_n^2$ denotes noise power, $I_T$ denotes a T-row, T-column unit matrix. By making a hard decision on x^ in equation (7), it is possible to obtain a transmission bit sequence. In this way, in the linear reception scheme, the number of the candidates of the transmitted signal is substantially narrowed down to one, so that it is possible to sharply cut down the amount of computing operation compared to that in MLD. Concerting the linear reception scheme, a description is found in Non-patent Document 2 mentioned hereinbelow.

However, the linear reception scheme can sharply reduce the amount of computing operation on one hand, but causes noise enhancement on the other hand, posing a problem of degrading reception performance.

In regard to MLD, there is a technique whereby preferable reception performance can be obtained while the candidates of the transmitted signal are narrowed down hence the amount of computing operation is markedly cut down, by searching in the direction of noise enhancement as the direction in which reception performance degrades. This technique is described in Patent Document 1 mentioned below.

FIG. 20 is a block diagram showing a configuration of a signal detector 5103 shown in Patent document 1. Signal detector 5103 in patent document 1 includes a transmitted signal candidate generator 5200, a metric generator 5206 and a minimum metric detector 5207. Transmitted signal candidate generator 5200 includes an initial signal generator 5201, adders 5202-1 to 5202-T, quantizers 5203-1 to 5203-T, parallel-to-serial converter 5204 and an updating value processor 5205. Initial signal candidate generator 5200 generates transmitted signal candidates. Initial signal generator 5201 generates an initial signal by multiplying the received signal by the weight on the ZF or MMSE basis given as equation (8) or equation (9). Adders 5202-1 to 5202-T each add the initial signal and the updating value obtained from updating value processor 5205. The added result is subjected to hard decision at quantizers 5203-1 to 5203-T, then parallel-to-serial converted by parallel-to-serial converter 5204 into a transmitted signal candidate.

Updating value processor 5205 determines updating value from the received signal, the initial signal and channel-estimated values, following the subsequent Eqs. The updating value is assumed to be u, u is determined by

[Math 7]

$$u = \mu_r v \quad (101)$$

$$v = P^q \tilde{H}^H (y - \tilde{H}\hat{s}(0)) \quad (102)$$

$$P = (\tilde{H}^H \tilde{H} + \sigma^2 I_T)^{-1} \quad (103)$$

$$\mu_r = [a(m) - (\hat{x})_t] / (v)_t \quad (104)$$

Here, q is an integer equal to or greater than 1, y is the received signal vector, s^(0) is the hard-decision result of the initial signal. $(\hat{x})_t$ and $(v)_t$ are the t-th elements of x^ and v, respectively. a(m) may take M values for each t; M the multiple-valued number for modulation. Since a transmitted signal candidate is obtained by adding updating value to the initial signal and then subjecting the sum to hard decision, as many candidates as the number of $\mu_r$, i.e., TM candidates are obtained. The obtained TM candidates are subjected to maximum likelihood detection. In the conventional MLD, metric calculations for $M^T$ candidates were performed. In contrast to this, the number of transmitted signal candidates can be sharply reduced. In addition, since transmitted signal candidates are searched for, by taking noise enhancement into account, it is possible to pick up candidates close to the actual transmitted signal. Accordingly, it is possible to inhibit degradation of reception performance while sharply cutting down the amount of computing operation.

Patent Document 1:
Japanese Patent Application Laid-open 2007-300586
Non-Patent Document 1:
X. Zhu and R. D. Murch, "Performance analysis of maximum likelihood detection in a MIMO antenna system, "IEEE Transaction on Communications, vol. 50, no. 2, pp. 187-191, February 2002.
Non-Patent Document 2:
Simon Haykin, Adaptive Filter Theory The Third Edition, published by Prentice-Hall 1996.

DISCLOSURE OF INVENTION

Problems to be Solved by the Invention

In communication systems, usually error correction coding is carried out in order to improve reception performance. As one of schemes that can present excellent error correction encoding performance, soft-decision error correction decoding, which performs error correction decoding on log likelihood ratios (LLR: Log Likelihood Ratio) as bit reliability information, has been known. In order to perform soft-decision error correction decoding, it is necessary to calculate bit LLRs after detection of MIMO signals. However, in the technology disclosed in Patent Document 1, no consideration is given for calculation of bit LLRs.

The present invention has been devised in view of the above circumstances, it is therefore an object of the invention to provide a receiving apparatus, a receiving method and a communication system for use in a MIMO communication system using soft-decision error correction coding, which can provide excellent reception performance whilst cutting down the amount of computing operation.

Means for Solving the Problems

The present invention resides in a receiving apparatus for performing communication in a MIMO system, comprising: a channel estimator for calculating a channel-estimated value; a signal detector for calculating a bit log likelihood ratio of a transmitted signal from a received signal; and, a decoder for performing an error correction decoding process for the bit log likelihood ratio, and is characterized in that the signal detector includes: a transmitted signal candidate generator for generating transmitted signal candidates; a metric generator for generating metrics with regard to the transmitted signal candidates; and, a likelihood processor for determining the transmitted signal candidate producing the minimum metric among the metrics, as the maximum likelihood sequence and calculating the bit log likelihood ratio for the maximum likelihood sequence, the transmitted signal candidate generator includes: an initial signal generator for generating an initial signal; an updating value processor for determining an updating value for the initial signal; an adder for summing up the initial signal and the updating value; and a quantizer for performing a hard-decision of the sum from the adder to generate the transmitted signal candidates, and the updating value processor includes: a search direction generator for calculating a direction in which reception performance degrades, at least based on the channel-estimated value; a step size generator for calculating a step size based on the initial signal and the direction in which the reception performance degrades; and, an updating value generator for calculating the updating value from the direction in which the reception performance degrades and the step size.

The apparatus is characterized in that the initial signal generator, generates the initial signal by multiplying the received signal with an weight coefficient that is calculated from the channel-estimated values, or generates a transmitted signal replica from the bit log likelihood ratio output from the decoder and sets the replica as the initial signal.

The apparatus is characterized in that the search direction generator calculates at least one direction that indicates noise enhancement as the direction in which the reception performance degrades, based on the weight coefficient.

The apparatus is characterized in that the search direction generator calculates at least one direction that indicates the noise enhancement, by the power method.

The apparatus is characterized in that the search direction generator further makes hard decision of the initial signal and calculates the direction indicating the noise enhancement based on a gradient of the metric of the hard-decision result.

The apparatus is characterized in that the likelihood processor determines the bit log likelihood ratio, by further taking the bit log likelihood ratio output from the decoder into consideration.

The apparatus is characterized in that the step size generator generates the step size so that the initial signal will be updated to a different hard-decision region.

The apparatus is characterized in that the likelihood processor generates a simplified metric from the step size and determines an inverted bit sequence of the maximum likelihood sequence that produces the minimum simplified metric, and calculates the bit log likelihood ratio from the inverted bit sequence and the metric of the maximum likelihood sequence.

The apparatus is characterized in that the likelihood processor includes: a fixed signal canceller for removing a signal including an inverted bit for the maximum likelihood sequence; a transmitted signal candidate generator for generating transmitted signal candidates for an output from the fixed signal canceller; a metric generator for generating metrics for the transmitted signal candidates; and, a likelihood calculator that determines the minimum metric among the metrics as the metric of the inverted bit and calculates the bit log likelihood ratio from the metric of the inverted bit and the metric of the maximum likelihood sequence.

Further, the present invention resides in a receiving apparatus for performing communication in a MIMO system, comprising: a channel estimator for calculating a channel-estimated value; a signal detector for calculating a bit log likelihood ratio of a transmitted signal from a received signal; and, a decoder for performing an error correction decoding process for the bit log likelihood ratio, and is characterized in that the signal detector includes: an approximate metric generator and a likelihood processor, the approximate metric generator includes: a fixed signal canceller for removing a modulation signal fixed at a certain transmitting antenna; a transmitted signal candidate generator for generating transmitted signal candidates for an output from the fixed signal canceller; a metric generator for calculating the metrics for the transmitted signal candidates; and a minimum metric generator for determining the minimum metric among the metrics, the likelihood processor calculates a bit log likelihood ratio of the maximum likelihood sequence from the metric output from the approximate metric generator, the transmitted signal candidate generator includes: an initial signal generator for generating an initial signal; an updating value processor for determining an updating value for the initial signal; an adder for summing up the initial signal and the updating value; and a quantizer for performing hard-decision of the sum from the adder to generate the transmitted signal candidates, and, the updating value processor includes: a search direction generator for calculating a direction in which reception performance degrades, at least based on the channel-estimated value; a step size generator for calculating a step size based on the initial signal and the direction in which the reception performance degrades; and, an updating value generator for calculating the updating value from the direction in which the reception performance degrades and the step size.

The apparatus is characterized in that the initial signal generator, generates the initial signal by multiplying the received signal with an weight coefficient that is calculated from the channel-estimated value, or generates a transmitted signal replica from a bit log likelihood ratio output from the decoder and sets the replica as the initial signal.

The apparatus is characterized in that the search direction generator calculates a direction that indicates the greatest noise enhancement based on the weight coefficient, by using the power method.

The apparatus is characterized in that the search direction generator makes a hard decision of the initial signal and calculates the noise enhanced direction based on a gradient of the metric of the hard-decision result.

The apparatus is characterized in that the likelihood processor determines the bit log likelihood ratio, by further taking the bit log likelihood ratio output from the decoder into consideration.

Also, the present invention is a receiving method in a receiving apparatus for performing communication in a MIMO system, comprising: a channel estimating step of calculating a channel-estimated value by channel estimating means; a signal detecting step of calculating a bit log likelihood ratio of a transmitted signal from a received signal by signal detecting means; and a decoding step of performing an error correction decoding process for the bit log likelihood ratio by decoding means, and is characterized in that the signal detecting step includes: a transmitted signal candidate generating step of generating transmitted signal candidates; a metric generating step of generating metrics with regard to the transmitted signal candidates; and, a likelihood processing step of determining a transmitted signal candidate producing the minimum metric among the metrics, as the maximum likelihood sequence and calculating a bit log likelihood ratio for the maximum likelihood sequence, the transmitted signal candidate generating step includes: an initial signal generating step of generating an initial signal; an updating value processing step of determining an updating value for the initial signal; an adding step of summing up the initial signal and the updating value; and a quantizing step of performing a hard-decision of the sum from the adder to generate the transmitted signal candidates, and, the updating value processing step includes: a search direction generating step of calculating a noise enhanced direction at least based on the channel-estimated value; a step size generating step of calculating a step size based on the initial signal and the noise enhanced direction; and, an updating value generating step of calculating the updating value from the noise enhancement vector and step size.

Also, the present invention resides in a receiving method in a receiving apparatus for performing communication in a MIMO system, comprising: a channel estimating step of calculating a channel-estimated value by channel estimating means; a signal detecting step of calculating a bit log likelihood ratio of a transmitted signal from a received signal by signal detecting means; and a decoding step of performing an error correction decoding process for the bit log likelihood ratio by decoding means, and is characterized in that the signal detecting step includes: an approximate metric generating step and a likelihood processing step, the approximate metric generating step includes: a fixed signal canceling step of removing a modulation signal fixed at a certain transmitting antenna; a transmitted signal candidate generating step of generating transmitted signal candidates for an output from the fixed signal canceling means; a metric generating step of calculating metrics for the transmitted signal candidates; and a minimum metric generating step of determining the minimum metric among the metrics, the likelihood processing step calculates a bit log likelihood ratio of the maximum likelihood sequence from the metrics output from the approximate metric generating means, the transmitted signal candidate generating step includes: an initial signal generating step of generating an initial signal; an updating value processing step of determining an updating value for the initial signal; an adding step of summing up the initial signal and the updating value; and a quantizing step of performing a hard-decision of the sum in the adding step to generate the transmitted signal candidates, and, the updating value processing step includes: a search direction generating step of calculating a noise enhanced direction at least based on the channel-estimated value; a step size generating step of calculating a step size based on the initial signal and the noise enhanced direction; and, an updating value generating step of calculating the updating value from the noise enhancement vector and step size.

The invention resides in a communication system including a transmitting apparatus and a receiving apparatus for performing communication in a MIMO system, and is characterized in that the transmitting apparatus transmits at least two data different from each other from a plurality of transmitting antennas, and the receiving apparatus includes: a channel estimator for calculating a channel-estimated value; a signal detector for calculating a bit log likelihood ratio of a transmitted signal from a received signal; and, a decoder for performing an error correction decoding process for the bit log likelihood ratio to determine data transmitted from the transmitting apparatus, and is characterized in that the signal detector includes: a transmitted signal candidate generator for generating transmitted signal candidates; a metric generator for generating metrics with regard to the transmitted signal candidates; and, a likelihood processor for determining a transmitted signal candidate producing the minimum metric among the metrics, as the maximum likelihood sequence and calculating a bit log likelihood ratio for the maximum likelihood sequence, the transmitted signal candidate generator includes: an initial signal generator for generating an initial signal; an updating value processor for determining an updating value for the initial signal; an adder for summing up the initial signal and the updating value; and a quantizer for performing a hard-decision of the sum from the adder to generate the transmitted signal candidates, and, the updating value processor includes: a search direction generator for calculating a noise enhanced direction, at least, based on the channel-estimated value; a step size generator for calculating a step size based on the initial signal and the noise enhanced direction; and, an updating value generator for calculating the updating value from the noise enhancement vector and the step size.

Further, the present invention resides in a communication system including a transmitting apparatus and a receiving apparatus for performing communication in a MIMO system, and is characterized in that the transmitting apparatus transmits at least two data different from each other from a plurality of transmitting antennas, and the receiving apparatus includes: a channel estimator for calculating a channel-estimated value; a signal detector for calculating a bit log likelihood ratio of a transmitted signal from a received signal; and, a decoder for performing an error correction decoding process for the bit log likelihood ratio to determine data transmitted from the transmitting apparatus, the signal detector includes: an approximate metric generator and a likelihood processor, the approximate metric generator includes: a fixed signal canceller for removing a modulation signal fixed at a certain transmitting antenna; a transmitted signal candidate generator for generating transmitted signal candidates for an output from the fixed signal canceller; a metric generator for calculating the metrics for the transmitted signal candidates; and a minimum metric generator for determining the minimum metric among the metrics, the likelihood processor calculates a bit log likelihood ratio of the maximum likelihood sequence from a metric output from the approximate metric generator, the transmitted signal candidate generator includes: an initial signal generator for generating an initial signal; an updating value processor for determining an updating value for the initial signal; an adder for summing up the initial signal and the updating value; and a quantizer for performing a hard-decision of the sum from the adder to generate the transmitted signal candidates, and, the updating value processor includes: a search direction generator for calculating a noise enhanced direction, at least, based on the channel-estimated value; a step size generator for calculating a step size based on the initial signal and the noise enhanced direction; and, an updating value generator for calculating the updating value from the noise enhancement vector and the step size.

Advantages of the Invention

According to the present invention, since the transmitted signal candidate that produces the minimum metric among the metrics of the transmitted signal candidates is determined as the maximum likelihood sequence, and the bit log likelihood ratio of the maximum likelihood sequence are calculated, it is possible to perform soft-decision error correction decoding and hence improve reception performance.

Since the search direction generator calculates the direction that indicates noise enhancement, based on the weight coefficient calculated from the channel-estimated value, especially based on the Power method and/or the gradient of the metric obtained as the result of the hard-decision of the initial signal, it is possible to sharply reduce the amount of computing operation compared to the conventional MLD, and it is hence possible to pick up candidates that are close to the actual transmitted signal.

Since the likelihood processor determines the bit log likelihood ratio, by further taking the bit log likelihood ratio output from the decoder into consideration, it is possible to improve the accuracy of the bit log likelihood ratio.

Since the step size generator generates the step size such that the initial signal will be updated to a different hard-decision region, it is possible to leave the inverted bit sequence as the transmitted signal candidate.

Since the likelihood processor determines the inverted bit sequence of the maximum likelihood sequence of which the simplified metric generated based on the step size takes the minimum, and calculates bit log likelihood ratios from the metrics of the inverted bit sequence and the maximum likelihood sequence, it is possible to determine the metrics of inverted bits in a simplified manner, hence reduce the amount of computing operation.

Since the likelihood processor determines the minimum metric among the metrics of the transmitted signal candidates and sets the metric as the metric of the inverted bit, and calculates the bit log likelihood ratios from the metric of the inverted bit and the metric of the maximum likelihood sequence, it is possible to reduce the amount of computing operation by taking noise enhancement into consideration.

According to the present invention, since the approximate metric generator calculates the metrics for the transmitted signal candidates to determine the minimum metric among the aforementioned metrics, and the likelihood processor calculates the bit log likelihood ratio of the maximum likelihood sequence from the metrics output from the approximate metric generator, not only the metric for the inverted bit but also the metrics for all the bits are calculated without determining the maximum likelihood sequence first. Accordingly, this configuration has the advantage that metric calculations can be done in parallel.

DESCRIPTION OF REFERENCE NUMERALS

Figure 1:
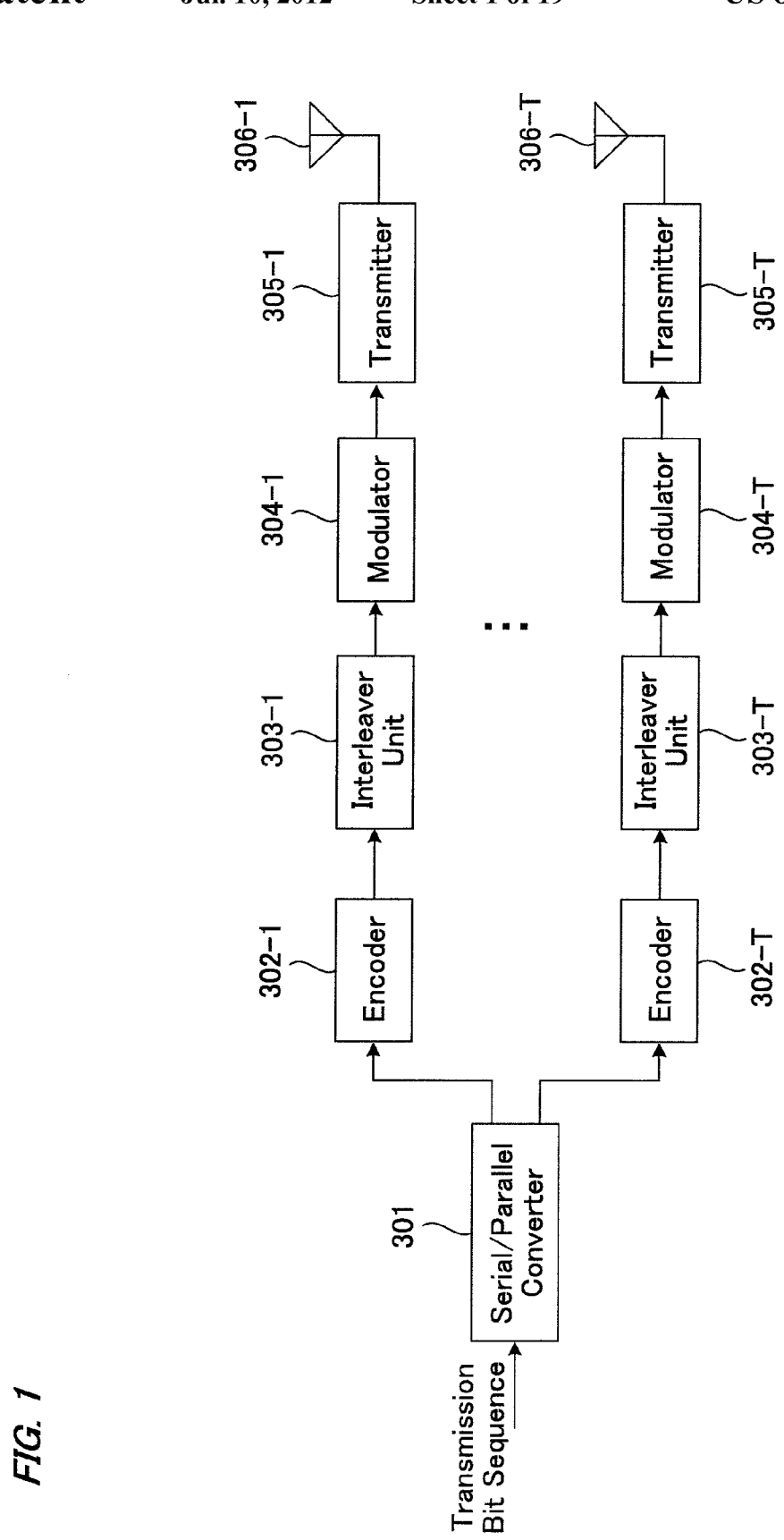
FIG. 1 is a block diagram showing a configuration of a transmitting apparatus in the first embodiment.

205 updating value processor
301 serial-to-parallel converter
302 encoder
303 interleaver unit
304 modulator
305 transmitter
306 transmitting antenna
401 receiving antenna
402 receiver
403 signal detector
404 channel estimator
405 deinterleaver unit
406 decoder
407 parallel-to-serial converter
500 transmitted signal candidate generator
501 initial signal generator
502 adder
503 quantizer
504 updating value processor
505 metric generator
506 likelihood processor
604 updating value processor
605 metric generator
606 likelihood processor
901 approximate metric generator
902 fixed signal canceller
903 transmitted signal candidate generator
904 metric generator
905 minimum metric generator
906 likelihood processor
1101 receiving antenna
1102 receiver
1103 signal detector
1104 channel estimator
1105 deinterleaver unit
1106 decoder
1107 parallel-to-serial converter
1200 transmitted signal candidate generator
1201 initial signal generator
1202 adder
1203 quantizer
1204 updating value processor
1205 metric generator
1206 likelihood processor
1301 interleaver unit
1302 symbol replica generator
1500 transmitted signal candidate generator
1501 initial signal generator
1502 adder
1503 quantizer
1504 updating value processor
1505 metric generator
1506 likelihood processor
1601 minimum metric generator
1602 fixed signal canceller
1603 transmitted signal candidate generator
1604 metric generator
1605 likelihood processor
1702*a* search direction generator
1702*b* search direction generator
1703*a* step size generator
1703*b* step size generator
1704*a* updating value generator
1704*b* updating value generator
3001 search direction generator
3002 step size generator
3003 updating value generator

BEST MODE FOR CARRYING OUT THE INVENTION

Now, embodiments of the present invention will be described with reference to the drawings. In the foregoing embodiments, a MIMO system in which different data are transmitted from T transmitting antennas will be described unless otherwise specified. Here, T is an integer equal to or greater than 2.

Embodiment 1

FIG. 1 is a block diagram showing a configuration of a transmitting apparatus in the first embodiment. The transmitting apparatus includes a serial-to-parallel converter 301, encoders 302-1 to 302-T, interleaver units 303-1 to 303-T, modulators 304-1 to 304-T, transmitters 305-1 to 305-T and transmitting antennas 306-1 to 306-T. A transmission bit sequence is serial-to-parallel converted by serial-to-parallel converter 301 so as to be divided into T bit sequences. The bit sequences are error correction coded by corresponding encoders 302-1 to 302-T, respectively, using, for example, convolution coding, turbo coding, LDPC (Low Density Parity Check) coding, or the like, and formed into encoded bit sequences. The encoded bit sequences are interleaved by interleavers 303-1 to 303-T, respectively. The encoded bit sequences after interleaving are mapped on modulation symbols such as QPSK (Quadrature Phase Shift Keying), 16QAM (Quadrature Amplitude Modulation) or the like, by modulators 304-1 to 304-T. The modulation symbols to be the transmitted signal are converted into radio frequency through transmitters 305-1 to 305-T and transmitted at an identical frequency at the same timing from associated transmitting antennas 306-1 to 306-T.

Figure 2:
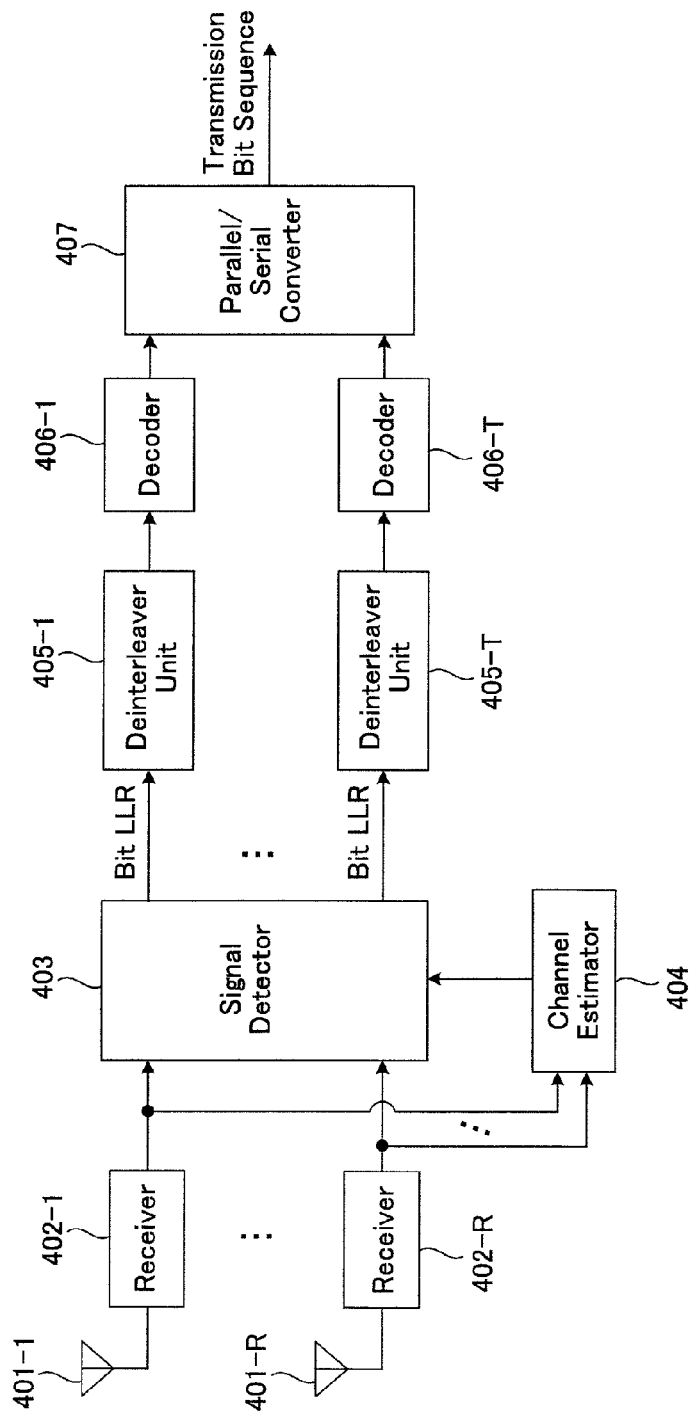
FIG. 2 is a block diagram showing a configuration of a receiving apparatus in the first embodiment.

FIG. 2 is a block diagram showing a configuration of a receiving apparatus in the first embodiment. The receiving apparatus includes receiving antennas 401-1 to 401-R, receivers 402-1 to 402-R, a signal detector 403, a channel estimator 404, deinterleaver units 405-1 to 405-T, decoders 406-1 to 406-T and a parallel-to-serial converter 407. The received waves picked up at receiving antennas 401-1 to 401-R are converted from the radio frequency to the baseband signals by associated receivers 402-1 to 402-R to be output as the received signals. Signal detector 403, based on the received signals and the channel estimated value obtained from channel estimator 404, calculates bit LLRs (Log Likelihood Ratio) of the transmitted signals. Details of signal detector 403 will be described later. The bit LLRs output from signal detector 403 are rearranged by deinterleaver units 405-1 to 405T in the pattern opposite to the pattern in which interleaving was performed on the transmission side. The bit LLRs after de-interleaving are each subjected to an error correction decoding process through decoders 406-1 to 406-T. The bit sequences after decoding are parallel-to-serial converted by parallel-to-serial converter 407 so that the detected transmission bit sequence is output.

Signal detector 403 performs MLD (Maximum Likelihood Detection) in a condition that transmitted signal candidates are reduced in number. In the first embodiment, transmitted signal candidates are selected by searching in the direction in which reception performance degrades. For example, the signal determined by ZF (Zero Forcing) or MMSE (Minimum Mean Square Error) is assumed to be the initial signal, and the signal points near the initial signal only are regarded as transmitted signal candidates to perform MLD. In the cases of ZF and MMSE, an initial signal $\hat{x}$ can be determined as follows, from a received signal y and a weight coefficient matrix W:

[Math 8]

$$\hat{x} = Wy$$

Yet, since in use of ZF or MMSE the inverse of the channel estimate matrix is multiplied, the result will take markedly large values depending on the channel conditions, causing noise enhancement. The noise enhancement will cause degradation of performance. Therefore, when the transmitted signal candidates are narrowed down, the candidates should be narrowed down by taking into account noise enhancement, instead of narrowing down into a uniform range from the initial signal.

Details of signal detector 403 will be illustrated.

Figure 3:
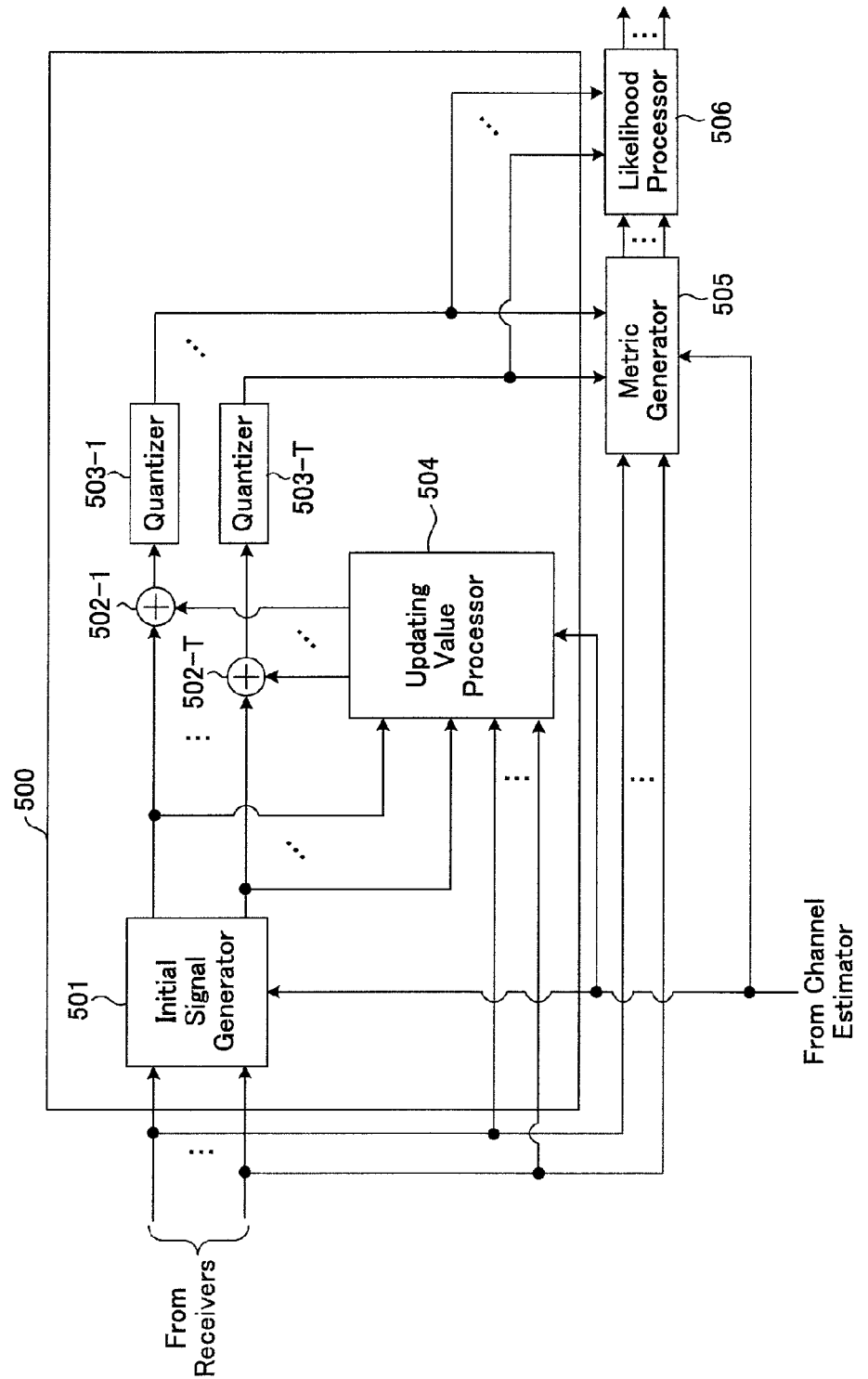
FIG. 3 is a block diagram showing a configuration of a signal detector.

FIG. 3 is a block diagram showing a configuration of signal detector 403. Signal detector 403 includes a transmitted signal candidate generator 500, a metric generator 505 and a likelihood processor 506. Transmitted signal candidate generator 500 includes an initial signal generator 501, adders 502-1 to 502-T, quantizers 503-1 to 503-T and an updating value processor 504. The received signal input from receivers 402-1 to 402-R is multiplied by a weight coefficient matrix based on, for example ZF, MMSE or the like, at initial signal generator 501 to generate an initial signal. The weight coefficient matrix of ZF, MMSE or like can be determined as in equation (10) or equation (11) from channel-estimated values input from channel estimator 404.

The weight coefficient matrix W given as

[Math 9]

$$W = (\tilde{H}^H \tilde{H})^{-1} \tilde{H}^H \quad (10)$$

is used on a ZF basis, and the matrix given as

[Math 10]

$$W = (\tilde{H}^H \tilde{H} + \sigma_n^2 I_T)^{-1} \tilde{H}^H \quad (11)$$

is used on a MMSE basis.

H represents a channel estimate matrix having channel-estimated values between transmission antennas and receiving antennas as its elements, the superscript "$H$" denotes a complex conjugate transposed matrix, $\sigma_n^2$ represents noise power, and $I_T$ represents a T-row, T-column unit matrix.

Updating value processor 504 calculates updating value based on the initial signal and channel-estimated values. Details of the updating value will be described later. Each initial signal and channel estimated value are added at adders 502-1 to 502-T. The added results are subjected to hard-decision through quantizers 503-1 to 503-T and formed into transmitted signal candidates. Metric generator 505 determines the metrics of the formed transmitted signal candidates by calculating

[Math 11]

$$\|y - \tilde{H}\hat{s}_c\|^2.$$

$\hat{s}_c$ represents a transmitted signal candidate generated by transmitted signal candidate generator 500. Likelihood processor 506 selects the transmitted signal candidate that produces the minimum metric of the metrics generated by metric generator 505, and calculates the bit LLRs of the selected transmitted signal candidate. The bit LLR is the necessary information when soft-decision error correction decoding is performed.

The process in likelihood processor 506 will be described. In likelihood processor 506, the likelihood is determined as follows:

[Math 12]

$$\lambda_{t,n} = -\frac{1}{\sigma_n^2} \min_{b+} \|y - \tilde{H}s_b\|^2 + \frac{1}{\sigma_n^2} \min_{b-} \|y - \tilde{H}s_b\|^2 \quad (18)$$

Here, $\lambda_{t,n}$ represents the LLR of the n-th bit of the modulation symbol transmitted from the t-th transmitting antenna. Further, $s_b$ represents the modulation symbol defined as $b = [b_{1,1}, \ldots, b_{t,n}, \ldots, b_{T,N}]$. $b^+$ represents the case when $b_{t,n}=1$, or $b^+=[b_{1,1}, \ldots, b_{t,n}=1, \ldots, b_{T,N}]$. $b^-$ represents the case when $b_{t,n}=0$ or $b^-=[b_{1,1}, \ldots, b_{t,n}=0, \ldots, b_{T,N}]$. Accordingly, $\lambda_{t,n}$ can be determined as the difference between the minimum metric at the time of $b^+$ and the minimum metric at the time of $b^-$.

The operation of updating value processor 504 will be described. When the updating value is assumed to be u, u is given as:

[Math 13]

$$u = \mu_r v \qquad (12).$$

$\mu_r$ represents the step size and v represents a T-dimensional vector that indicates the direction in which noise is enhanced. In other words, transmitted signal candidates will be searched for by moving the search range from the initial signal toward the noise enhancement direction by the step size.

Figure 4:
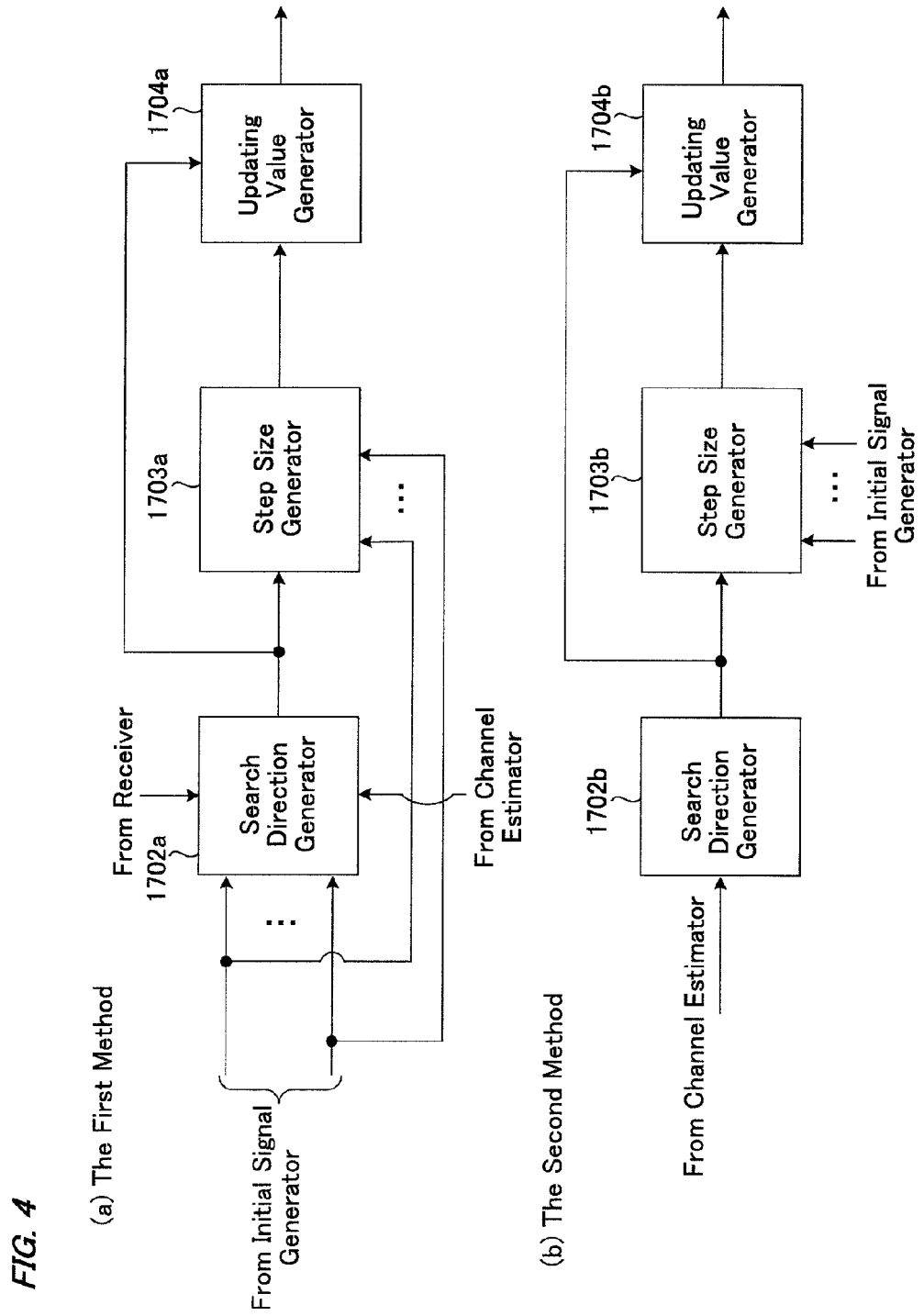
FIG. 4 is a block diagram showing a configuration of an updating value processor in the first embodiment.

Now, two methods will be shown to determine v. The first method is the technique disclosed in Patent Document 1, and v is determined based on the gradient of the metric obtained as the result of the hard-decision of the initial signal. FIG. 4(*a*) is a block diagram of updating value processor 205 using the first method. In the first method, a search direction generator 1702*a*, based on the received signal input from the receivers, the channel-estimated values input from the channel estimator and hard-decision result of the initial signal, generates a direction that indicates noise enhancement as in equation (13).

[Math 14]

$$v = P^q \tilde{H}^H (y - \tilde{H}\hat{s}(0)) \qquad (13)$$

$$P = (\tilde{H}^H \tilde{H} + \sigma_n^2 I_T)^{-1} \qquad (14)$$

Here, q is an integer equal to or greater than 1, y is the received signal vector, $\hat{s}(0)$ is the hard decision result of the initial signal. A step size generator 1703*a* generates a step size from the v generated by search direction generator 1702*a* and the initial signal. An updating value generator 1704*a* determines updating value using $\mu_r$ and v, as in equation (12).

The second method is a method in which the eigenvector having the maximum eigenvalue of matrix P in equation (14) is set as v. FIG. 4(*b*) is a block diagram of updating value processor 205 using the second method. In the second method, search direction generator 1702*b* generates a direction that indicates noise enhancement, based on the channel-estimated values input from the channel estimator. For example, the matrix P in equation (14) is the primary factor of noise enhancement, and since the maximum eigenvalue is the maximum component that brings about noise enhancement, the eigenvector corresponding to the maximum eigenvalue of the matrix P is set as v. The eigenvector of the maximum eigenvalue can be calculated using, for example, the power method, as follows:

[Math 15]

$$Pv_i = z \qquad (15)$$

$$v_{i+1} = z/\|z\| \qquad (16)$$

Here, i is an integer equal to or greater than 1. After the operations of (15) and (16) are repeated several times, the finally obtained $v_i$ may be set as v. The initial vector $v_1$ may use an arbitrary vector having a magnitude of 1. Though the power method was illustrated as the method for determining the eigenvector, the power method is not necessarily needed to be used. For example, eigenvalue decomposition (EVD: Eigen Value Decomposition) may be used to determine v.

Step size generator, 1703*b* generates a step size $\mu_r$, based on the v generated by search direction generator 1702*b* and the initial signal input from the initial signal generator. An updating value generator 1704*b* determines updating value from $\mu_r$ and v, as in equation (12).

Here, in the first method, noise enhancement direction v is determined based on the received signal, hard-decision value of the initial signal and the channel-estimated values. In the second method, noise enhancement direction v is determined based on the channel-estimated values. Therefore, in the second method, it is not necessary to input the received signal from the receiver into updating value processor 504 in FIG. 3. This will be the same as in the embodiments hereinbelow.

The method of calculating step size $\mu_r$ will be described.

[Math 16]

$$\mu_r = [a(m) - (\hat{x})_t]/(v)_t \qquad (17)$$

$(\hat{x})_t$ and $(v)_t$ represent the t-th elements of $\hat{x}$ and v, respectively. a(m) may take M. values for each t; M is the multiple-valued number for modulation. For example, in a case where QPSK is used as the modulation scheme, a(m) may take four values

[Math 17]

$$\frac{1}{\sqrt{2}}(\pm 1 \pm j) \text{ (arbitrary combinations of signs).}$$

Since a transmitted signal candidate is the result obtained by adding updating value to the initial signal and then subjecting the sum to hard decision, as many candidates as the number of $\mu_r$, i.e., TM candidates can be obtained. The obtained TM candidates are subjected to maximum likelihood detection.

Compared to the conventional MLD in which metric calculations were performed for $M^T$ candidates, the number of transmitted signal candidates can be sharply reduced. In addition, since transmitted signal candidates are searched for, by taking noise enhancement into consideration, it is possible to pick up candidates that are close to the actual transmitted signal. Accordingly, it is possible to inhibit degradation of reception performance while sharply cutting down the amount of computing operation.

Further, since there is the possibility that redundant candidates exist among the obtained TM transmitted signal candidates depending on the step size value, the redundant candidates can be unified into one candidate so that it possible to further reduce the number of candidates. In place of removed redundant candidates, additional signal points may be added as new candidates.

Further, since the number of candidates are determined depending on the number of step size, in order to further reduce the number of candidates, it is possible to further narrow down the candidates by varying the step size value. For example, in order to avoid searching for signal points that are greatly apart due to setting a too large step size, only step sizes equal to or smaller than a threshold may be selected from TM step sizes, or it is also possible to select a predetermined number of candidates in the order from the smallest absolute value of the step size. When the transmitted signal candidates are narrowed down only to those obtained from the selected step sizes, the amount of computing operation can be further cut down.

In the above way, in the first embodiment, since bit LLRs after MIMO detection are calculated so as to perform soft-decision error correction decoding, it is possible to improve reception performance.

Embodiment 2

In the first embodiment, the method of calculating bit LLRs when combined with error correction was illustrated. However, when the optimal bit LLR is determined, the minimum metric among inverted bit sequences is needed so that computing operation as much as that of MLD is required. When MLD with transmitted signal candidates reduced in number is used, if any inverted bit sequence remains in the candidates, it is possible to use the minimum metric of the remaining inverted bit sequence in calculating bit LLRs. However, in the first embodiment, concerning transmitted signal candidates, the transmitted signal candidates were searched out in order to determine the maximum likelihood sequence. However, in this case, there is a possibility that no inverted bit sequence will remain in the transmitted signal candidates, and if this case happens, it is impossible to calculate any bit LLR. In the second embodiment, a narrowing down method of transmitted signal candidates will be described by taking calculation of bit LLRs into consideration.

A way of leaving an inverted bit sequence as a transmitted signal candidate can be realized by expanding the method explained with FIG. 4(b) in the first embodiment. In the method of the first embodiment described with FIG. 4(b), transmitted signal candidates were efficiently reduced by making a search by regarding the eigenvector of the maximum eigenvalue in equation (14) as the noise enhancement direction. In the second embodiment, inverted bit sequences are made to readily remain in the transmitted signal candidates by making a search by using the eigenvectors of a plurality of eigenvalues, not limited to the maximum eigenvalue.

Figure 5:
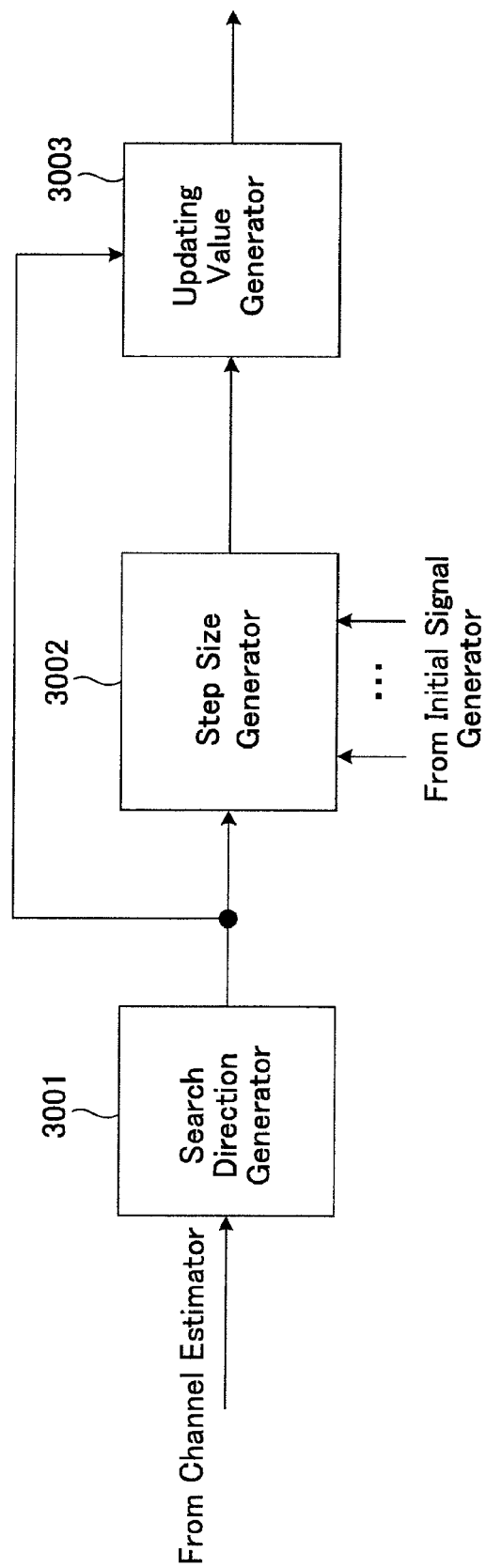
FIG. 5 is a block diagram showing a configuration of an updating value processor in the second embodiment.

FIG. 5 is a block diagram showing a configuration of an updating value processor described in the first embodiment. The updating value processor includes a search direction generator 3001, a step size generator 3002 and an updating value generator 3003. The operation of search direction generator 3001 will be described. A plurality of eigenvectors of equation (14) are determined using the power method as shown below. To begin with, initial matrix $P_1$ is set as P.

[Math 18]

$$P_1 = P \quad (200)$$

First, the operation of equation (201) is repeated several times for $P_1$.

[Math 19]

$$v_{i+1,1} = \frac{P_1 v_{i,1}}{\|P_1 v_{i,1}\|} \quad (201)$$

When the set number of times is p, $v_{p,1}$ after p times of repetition is regarded as the eigenvector of the maximum eigenvalue for $P_1$.

Next, a matrix $P_2$ that is obtained by removing the $v_{p,1}$ component from $P_1$, is generated as follows:

[Math 20]

$$z_1 = \frac{\|P_1 v_{p,1}\|}{\|v_{p,1}\|} \quad (202)$$

$$P_2 = P_1 - z_1 v_{p,1} v_{p,1}^H \quad (203)$$

The eigenvector $v_{p,2}$ of the maximum eigenvalue of $P_2$ is calculated in the same manner. In this way, $P_3$ and afterwards are calculated in the same manner, so that $P_1$ to $P_D$ and the associated eigenvectors $v_{p,1}$ to $v_{p,D}$ of the maximum eigenvalue are determined and $v_{p,1}$ to $v_{p,D}$ are set as the search directions. Here, D is an integer equal to or greater than 1 and equal to or smaller than T. Also, $v_{p,1}$ to $v_{p,D}$ indicate that noise is enhanced in the order from 1 to D. Since $v_{p,1}$ to $v_{p,D}$ are eigenvectors, $v_{p,1}$ to $v_{p,D}$ are orthogonal to each other. Because the search directions are orthogonal to one another, it is possible to increase the probability of inverted bit sequences being included. Though the number of repetition for calculating each of $v_{p,1}$ to $v_{p,D}$ was set at p, different numbers of repetition may be used for individual vectors, $v_{p,1}$ to $v_{p,D}$.

Step size generator 3002 determines step sizes $\mu_{d,r}$ from search directions $v_{p,1}$ to $v_{p,D}$ and the initial signal $\hat{x}$. Here, d=1, 2, ..., D.

[Math 21]

$$\mu_{d,r} = \rho_{t,m} \frac{\eta_{t,m}}{(v_{p,d})_t} \quad (204)$$

$$\eta_{t,m} = a(m) - (\hat{x})_t \quad (205)$$

$$\rho_{t,m} = \quad (206)$$

$$\begin{cases} 1.0 & \text{When } a(m) = (\hat{s})_t \\ \xi + \frac{(1-\xi)|\text{Re}[(\hat{x})_t]|}{|\text{Re}(\eta_{t,m})|} & \text{When } a(m) \neq (\hat{s})_t \text{ and } |\text{Re}(\eta_{t,m})| \rangle |\text{Im}(\eta_{t,m})| \\ \xi + \frac{(1-\xi)|\text{Im}[(\hat{x})_t]|}{|\text{Im}(\eta_{t,m})|} & \text{When } a(m) \neq (\hat{s})_t \text{ and } |\text{Re}(\eta_{t,m})| \langle |\text{Im}(\eta_{t,m})| \end{cases}$$

In order to leave inverted bit sequences as the transmitted signal candidates, it is necessary to determine an updating value so that updating is performed into a region different from the hard-decision region of the initial signal. Since the updating value is calculated from the step size, the step size plays an important role in updating the initial signal. For example, in a case of QPSK modulation, if the hard-decision value of the initial signal is (0,0), the initial signal needs to be updated into such a region that the hard-decision value of the updated signal falls at (1,0). For this purpose, $\xi > 0$ is needed. Further, if $\xi$ is too large, the updated signal is separated from the initial signal, so that $\xi$ is preferably set to be close to 0, e.g., 0.001. Updating value generator 3003 generates updating value as in equation (12), based on the search direction generated by search direction generator 3001 and the step size. v in equation (12) becomes $v_{p,1}$ to $v_{p,D}$ in the second embodiment.

Figure 6:
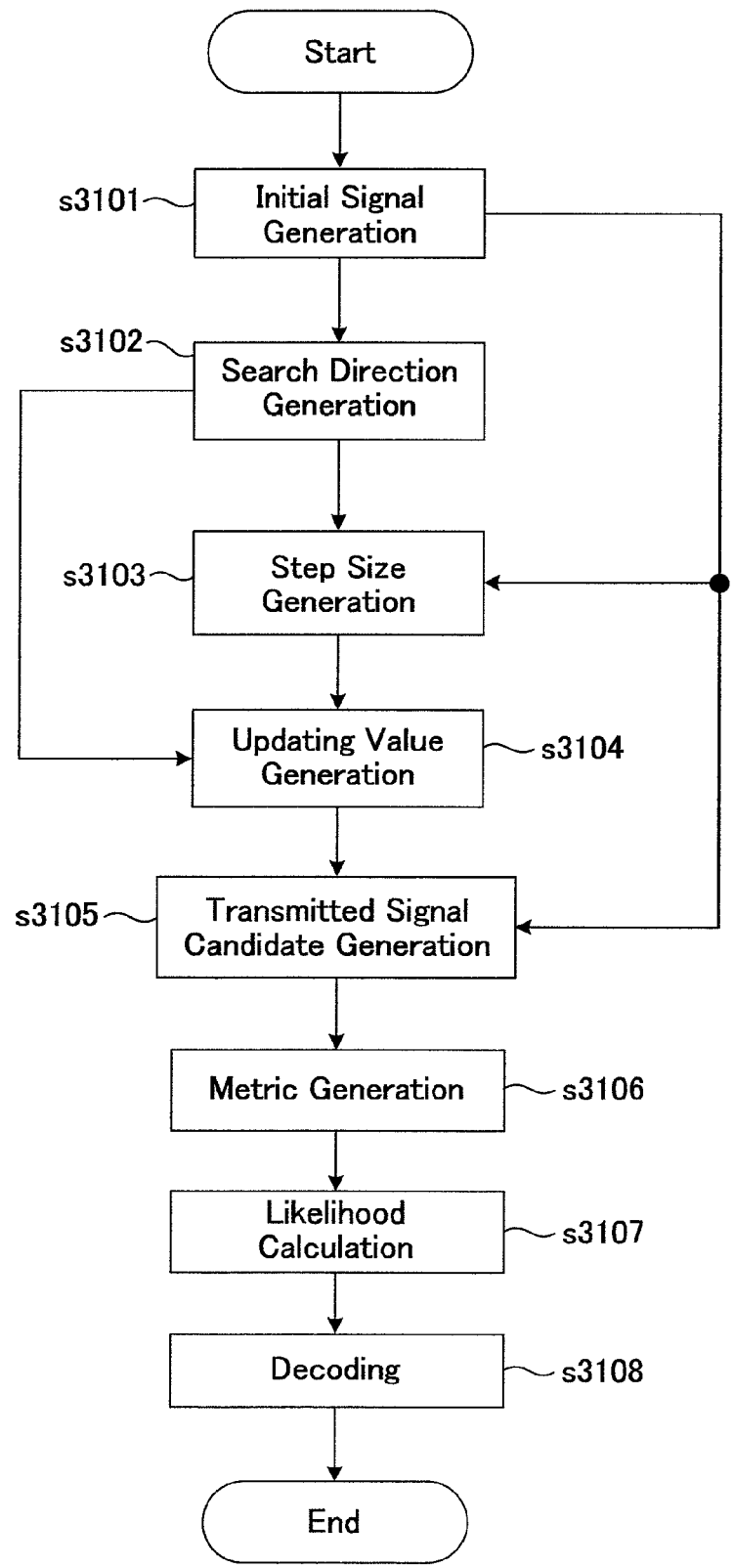
FIG. 6 is a flow chart for a receiving process in the second embodiment.

FIG. 6 is a flow chart for the receiving process in the second embodiment. In the receiving process, first, the initial signal is generated from the received signal using the weight of MMSE, ZF or the like, at Step s3101. At Step s3102, as the search direction, a plurality of eigenvectors for the part of the MMSE, ZF or other weight, that causes noise enhancement are determined in the order in which noise is enhanced. At Step size s3103, based on the search direction and the initial signal, a step size is calculated so that inverted bit sequences will be left as the candidates. At Step size s3104, the updating value is added to the initial signal, and the added result is subjected to hard decision so as to generate transmitted signal candidates. At Step s3106, the metrics for the transmitted signal candidates are calculated. At Step s3107, the maximum likelihood sequence and its bit LLRs are calculated from the metrics generated at Step s3106. At Step s3108, the bit LLRs are subjected to error correction decoding.

Embodiment 3

In the third embodiment, a method of calculating bit LLRs in a simplified manner, using a step size will be described.

Described in the third embodiment is a method of calculating bit LLRs by determining inverted bit sequences of which the metric needs to be generated, using the step size generated in the first embodiment, and generating the metrics of the determined inverted bit sequences.

Figure 7:
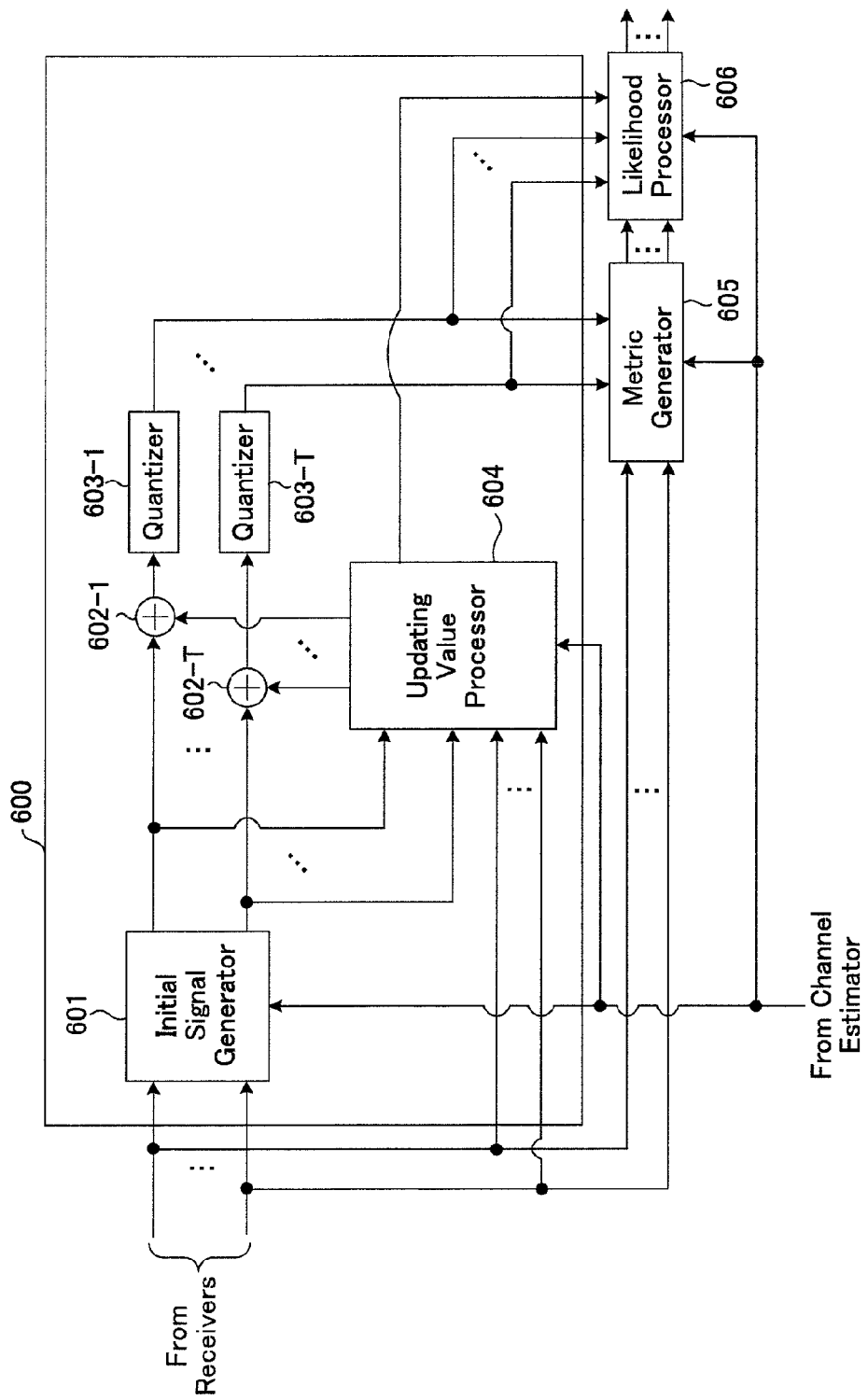
FIG. 7 is a block diagram showing a configuration of a signal detector in the third embodiment.

FIG. 7 is a block diagram showing a configuration of a signal detector 403 in the third embodiment. The difference from the signal detector 403 in the second embodiment is that a step size is output from updating value processor 604 to likelihood processor 606. First, likelihood processor 606 selects the transmitted signal candidate producing the minimum metric and determines the metric of the inverted bits of the selected transmitted signal candidate by considering the step size. Therefore, updating value processor 604 and likelihood processor 606 will be mainly described herein.

Updating value processor 604 outputs a step size $\mu_r$ calculated based on equation (17) for example, to likelihood processor 606. Likelihood processor 606 selects the transmitted signal candidate that produces the minimum metric of the metrics input from metric generator 605. Concerning the bit LLRs of the selected transmitted signal candidate, if the metrics of the inverted bit sequences have been generated by metric generator 605, the minimum one of the generated metrics can be used. If no metric has been generated, inverted bit sequences of which the metric should be generated are selected using the step size $\mu_r$. For example, suppose that there are two transmitting antennas and the signals are transmitted by QPSK. The transmitted signals at the transmitting antennas are represented as $s_1$ and $s_2$. Since QPSK is used, each transmission bit sequence is composed of four bits, so that there are sixteen transmitted signal candidates. The transmission bit sequence is assumed to be $(b_{1,1}, b_{1,2}, b_{2,1}, b_{2,2})$. $b_{i,j}$ represents the j-th bit from the i-th transmitting antenna.

Now, suppose that the bit sequence producing the minimum metric is (0,0,0,0). It is assumed that no inverted bit sequence for the first bit exists in the candidates. In order to achieve high precision, the bit LLRs have to be calculated using the minimum metric among the eight sequences having 1 at the first bit, so that a large amount of computing operation is needed. Therefore, simplified metrics are calculated based on the step size determined at updating value processor 604, so that the inverted bit sequence producing the minimum metric is determined. Then, the metric of the determined bit sequence is calculated and the bit LLRs are calculated.

Since the number of transmitting antennas is 2, and QPSK is used as the modulation scheme, there exist eight $\mu_r$s. The bits that constitute QPSK, (0,0), (0,1), (1,1) and (1,0) are numbered with 1, 2, 3 and 4, respectively. $\mu_1$ to $\mu_4$ are made correspondent to the respective numbers of QPSK at the first transmitting antennas, and $\mu_5$ to $\mu_8$ are made correspondent to the numbers, 1, 2, 3 and 4 at the second transmitting antennas. For example, the simplified metric of (1,0,0,1), one of the inverted bit sequence, can be expressed by the sum of the absolute values of step sizes $\mu_4$ and $\mu_6$, $\mu_4$ being the step size obtained by calculation with (1,0) at the first transmitting antenna, $\mu_6$ being the step size obtained by calculation with (0,1) at the second transmitting antenna. Similarly, the simplified metric of (1,1,1,0) can be expressed by the sum of the absolute values of $\mu_3$ and $\mu_8$.

In the above way, all the simplified metrics for inverted bit sequences are calculated so as to select the bit sequence producing the minimum simplified metric. The metric for the selected bit sequence is calculated to determine the bit LLR. The same calculations are also performed for the second to fourth bits, and the bit LLRs for the bit sequence (0,0,0,0) having the minimum metric are determined. Though the description herein was made taking the case where the number of transmitting antennas is 2 and QPSK is used as the modulation scheme, the same operation can be done with an arbitrary number of transmitting antennas based on any modulation scheme.

Figure 8:
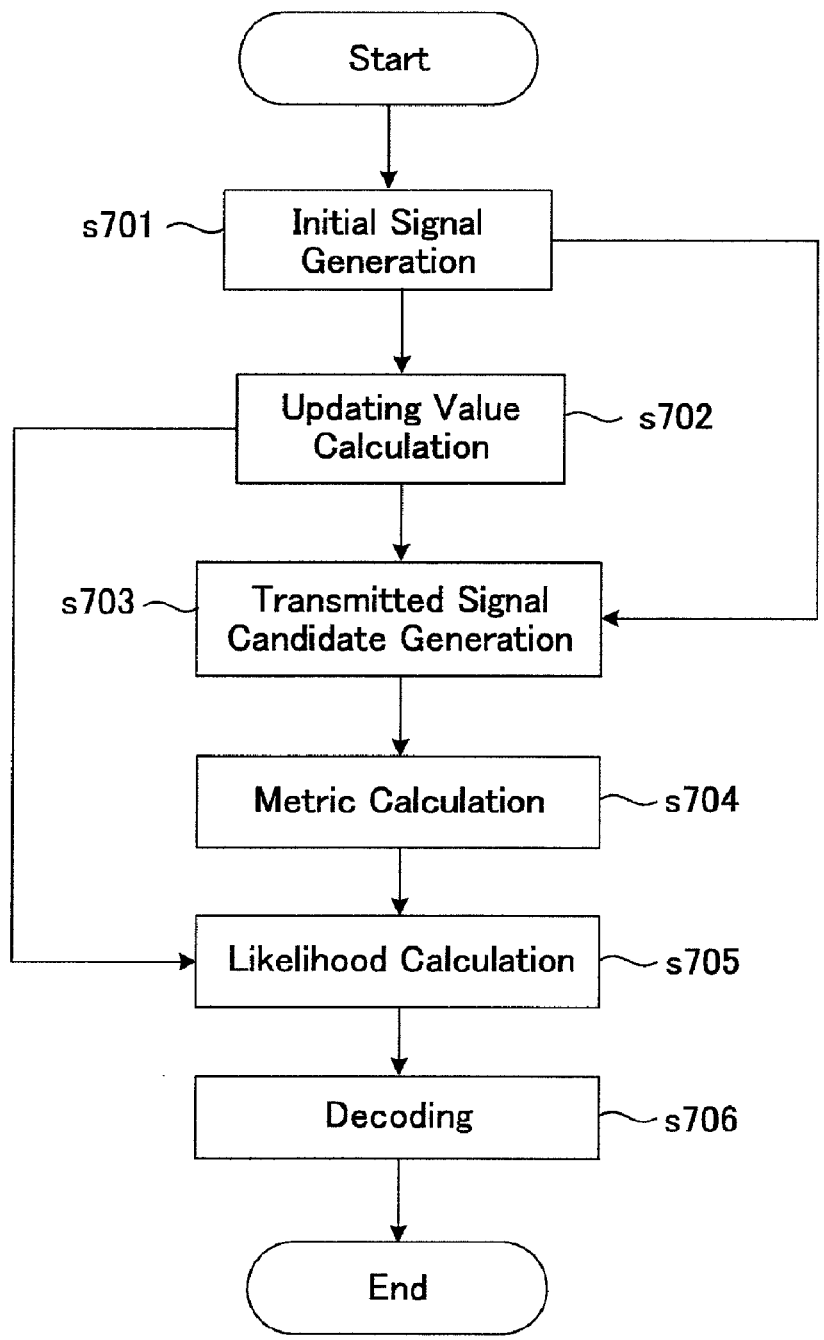
FIG. 8 is a flow chart showing a receiving process in the third embodiment.

FIG. 8 is a flow chart for the receiving process in the third embodiment. First, the received signal is input to generate an initial signal by MMSE or ZF, for example (Step s701). The initial signal is transferred to Step s702 and Step s703. At Step s702, the directional vector that indicates the direction of degradation due to noise enhancement and the step size for searching in the degrading direction are calculated based on the channel-estimated values, so that updating value is calculated from the directional vector and the step size. The updating value is sent to Step s703 while the step size is sent to s705. At Step s703, the updating value is added to the initial signal, and the added result is subjected to hard-decision so as to generate transmitted signal candidates. At Step s704, the metric of each transmitted signal candidate is generated.

At Step s705, the maximum likelihood sequence producing the minimum metric among the metrics generated at Step s704 is determined, and the bit LLRs for the maximum likelihood sequence are calculated. The metric of the inverted bits needed for bit LLR calculation is determined by calculating simplified metrics from the step size obtained at Step s702, selecting the sequence producing the minimum simplified metric and calculating the metric of that sequence. The bit LLRs calculated at Step s705 are subjected to an error correction decoding process at Step s706 so that the transmission bit sequence is obtained. The receiving process is completed by outputting the transmission bit sequence obtained at Step s706.

In the above way, when the metrics of the inverted bits are determined in a simplified manner making use of the step size, it is possible to reduce the amount of computing operation required for bit LLR calculation.

Here, the bit sequence in which only the bit that corresponds to the bit LLR to be determined is inverted, may be selected as the target inverted bit sequence of which the metric is calculated. For example, calculation may be performed such that (1,0,0,0) is set as the inverted bit sequence when the LLR of the first bit for (0,0,0,0) is calculated, and that (0,1,0,0) is set for the second bit.

Embodiment 4

In the third embodiment, the step size is used to determine the inverted bit sequence producing the minimum metric, in a simplified manner. In the fourth embodiment, another bit LLR calculating method will be described.

Figure 9:
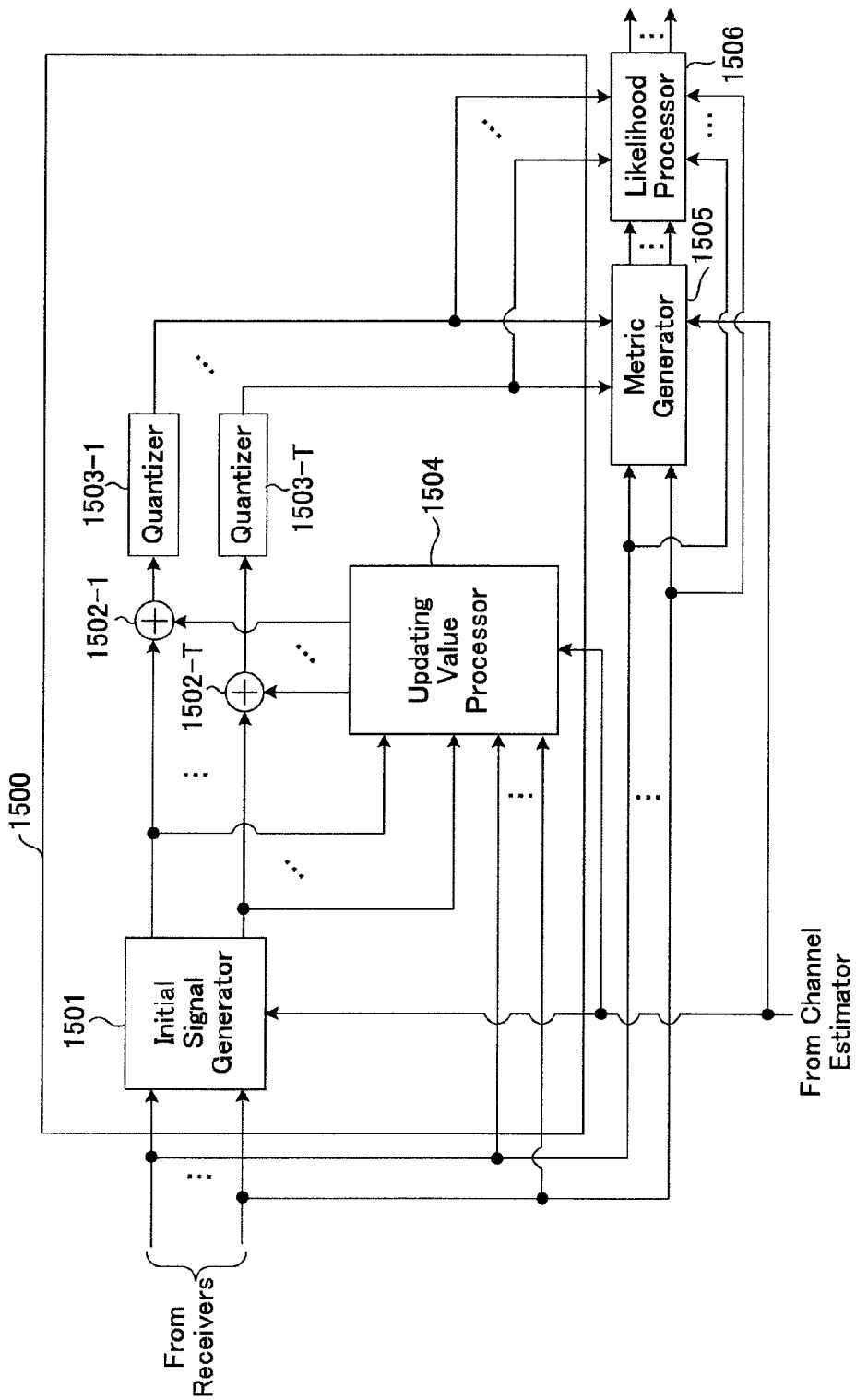
FIG. 9 is a block diagram showing a configuration of a signal detector in the fourth embodiment.

FIG. 9 is a block diagram showing a configuration of a signal detector in the fourth embodiment. The signal detector includes a transmitted signal candidate generator 1500, a metric generator 1505 and a likelihood processor 1506. Transmitted signal candidate generator 1500 includes an initial signal generator 1501, adders 1502-1 to 1502-T, quantizers 1503-1 to 1503-T and an updating value processor 1504.

The signal detector of the fourth embodiment is almost the same as in the second embodiment. Since the difference resides in the process at likelihood processor 1506, detailed description on likelihood processor 1506 only will be given.

Figure 10:
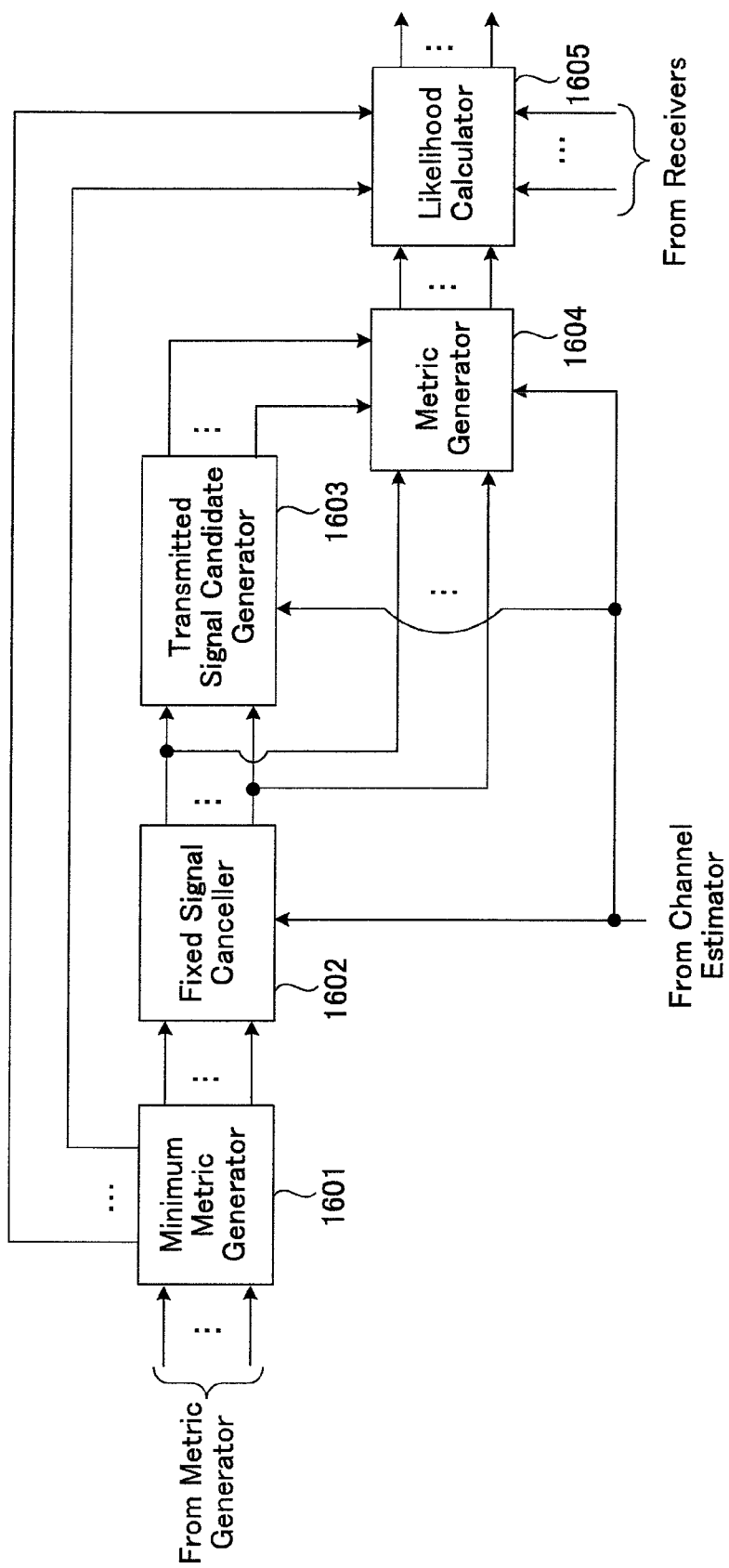
FIG. 10 is a block diagram showing a configuration of a likelihood processor 1506 in the fourth embodiment.

FIG. 10 is a block diagram showing likelihood processor 1506 in the fourth embodiment. The likelihood processor includes a minimum metric generator 1601, a fixed signal canceller 1602, a transmitted signal candidate generator 1603 a metric generator 1604 and a likelihood calculator 1605. First, minimum metric generator 1601 detects the sequence producing the minimum metric among the input metrics, as the maximum likelihood sequence. The maximum likelihood sequence is sent to fixed signal canceller 1602 and the minimum metric is sent to likelihood calculator 1605.

The maximum likelihood sequence detected at minimum metric generator 1601 is put as

[Math 22]

$$\hat{s} = [\hat{s}_1 \nabla \hat{s}_t \nabla \hat{s}_T]^T \quad (19).$$

Suppose, for example, that the modulation scheme is QPSK and the decision bits of $\hat{s}_t$ are (1,0). For the first bit of the decision bit of $\hat{s}_t$, "1", the possible inverted bits are (0,0) and (0,1). Suppose that the possible value of the n-th inverted bit of the transmitted signal at the t-th transmission antenna is given as $\eta_q$; q satisfies $1 \leq q \leq Q$, and

[Math 23]

$$Q = \frac{M}{2}. \quad (20)$$

Since M=4 in QPSK, Q=2.

[Math 24]

$$\bar{s}_{t,q} = [0 \nabla 0 \, \eta_q \, 0 \nabla 0]^T \quad (21)$$

is a vector having $\eta_g$ at the t-th element with the other elements set at zero.

Fixed signal canceller 1602 removes the components including inverted bits, from received signal y, by use of

[Math 25]

$$y_{\bar{t},q} = y - \tilde{H}\bar{s}_{t,q} \quad (22).$$

Here, $y_{t,q}$ is put anew as

[Math 26]

$$y_{\bar{t},q} = \tilde{H}_{\bar{t}} s_{\bar{t}} + n \quad (23).$$

Here, $H_{\bar{t}}$ is given as

[Math 27]

$$\tilde{H}_{\bar{t}} = \begin{pmatrix} \tilde{h}_{11} & \Lambda & \tilde{h}_{1(t-1)} & \tilde{h}_{1(t+1)} & \Lambda & \tilde{h}_{1T} \\ M & O & M & M & O & M \\ \tilde{h}_{R1} & \Lambda & \tilde{h}_{R(t-1)} & \tilde{h}_{R(t+1)} & \Lambda & \tilde{h}_{RT} \end{pmatrix}, \quad (24)$$

and is an R-row, (T−1)-column matrix that is obtained by removing the t-th column from H.

Further, $s_{\bar{t}}$ is given as

[Math 28]

$$s_{\bar{t}} = [s_1 \nabla s_{t-1} s_{t+1} \nabla s_T]^T \quad (25),$$

and is a (T−1)-dimensional vector that is obtained by removing the t-th element from s. Transmitted signal candidate generator 1603 generates transmitted signal candidates for equation (23), as described in the first embodiment.

Metric generator 1604 calculates the metric for each transmitted signal candidate. Upon this calculation, the metric is calculation with the t-th element of the transmitted signal set at $\eta_q$. Likelihood calculator 1605 determines the minimum metric $L_{t,n,q}$ among the metrics generated by metric generator 1604. The minimum metric is determined for every q, and the least one among $L_{t,n,1}$ to $L_{t,n,Q}$ is set as metric $L_{t,n}$ of the inverted bit, and then the LLR of the n-th bit from the k-th transmitting antenna is calculated using $L_{t,n}$. When $L_{t,n}$ is determined for every t and n in the same manner, it is possible to determine the LLRs for all the bits. It is noted that the initial signal used for reducing the number of candidates when LLRs are calculated, may use as the maximum likelihood sequence determined at the beginning, without use of MMSE. In this case, the MMSE process is unnecessary, so that the amount of computing operation is cut down.

Figure 11:
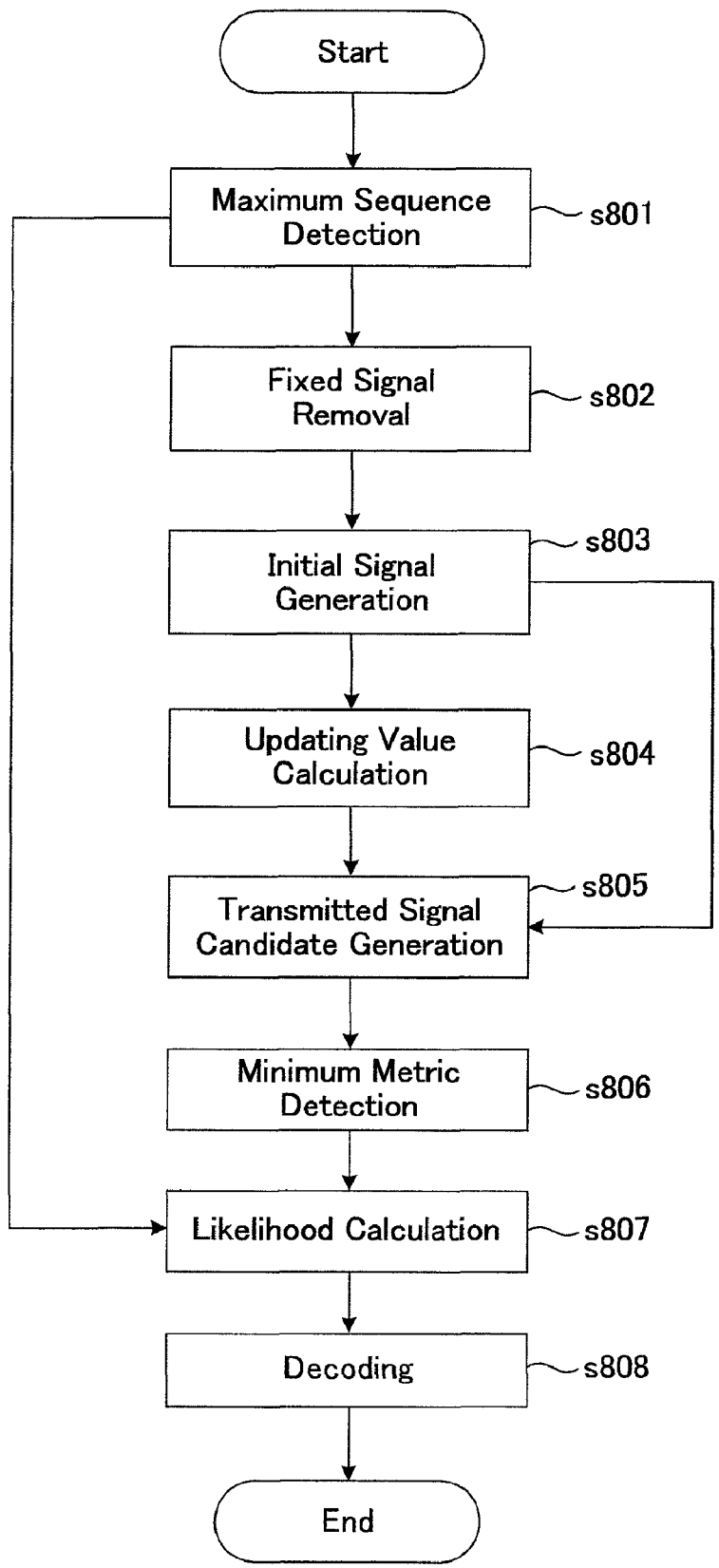
FIG. 11 is a flow chart for a receiving process in the fourth embodiment.

FIG. 11 is a flow chart for the receiving process in the fourth embodiment. First, at Step s801 the maximum likelihood sequence is detected from the received signal and its metric is generated. From Step s802 to Step s805, the bit LLRs for the maximum likelihood sequence detected at Step s801 are calculated. At Step s802, a signal for fixing the inverted bit corresponding to a certain signal included in the maximum likelihood sequence is determined and removed from the received signal. At Step s803 an initial signal for the signal from which the fixing signal has been removed, is generated by MMSE or the like. At Step s804, updating value is determined by taking noise enhancement into consideration. At Step s805 transmitted signal candidates are generated in the signal from which the fixing signal has been removed, based on the initial signal and the updating value. At Step s806, the metric of each transmitted signal candidate is calculated so as to output the minimum metric. At Step s807, based on the metric of the maximum likelihood sequence obtained at Step s801 and the metric of its inverted bit, bit LLRs are calculated. At Step s808, error correction decoding is performed, and the obtained transmission bit sequence is output to complete the process.

In the above way, in the fourth embodiment, since used is the method of reducing the amount of computing operation by taking noise enhancement into consideration when calculating the minimum metric of the inverted bit at the time of bit LLR calculation, it is possible sharply reduce the amount of computing operation compared to MLD.

Embodiment 5

The fifth embodiment shows a case in which the LLRs for all bits are calculated using the bit LLR calculation method described in the fourth embodiment, without determining the maximum likelihood sequence first.

Figure 12:
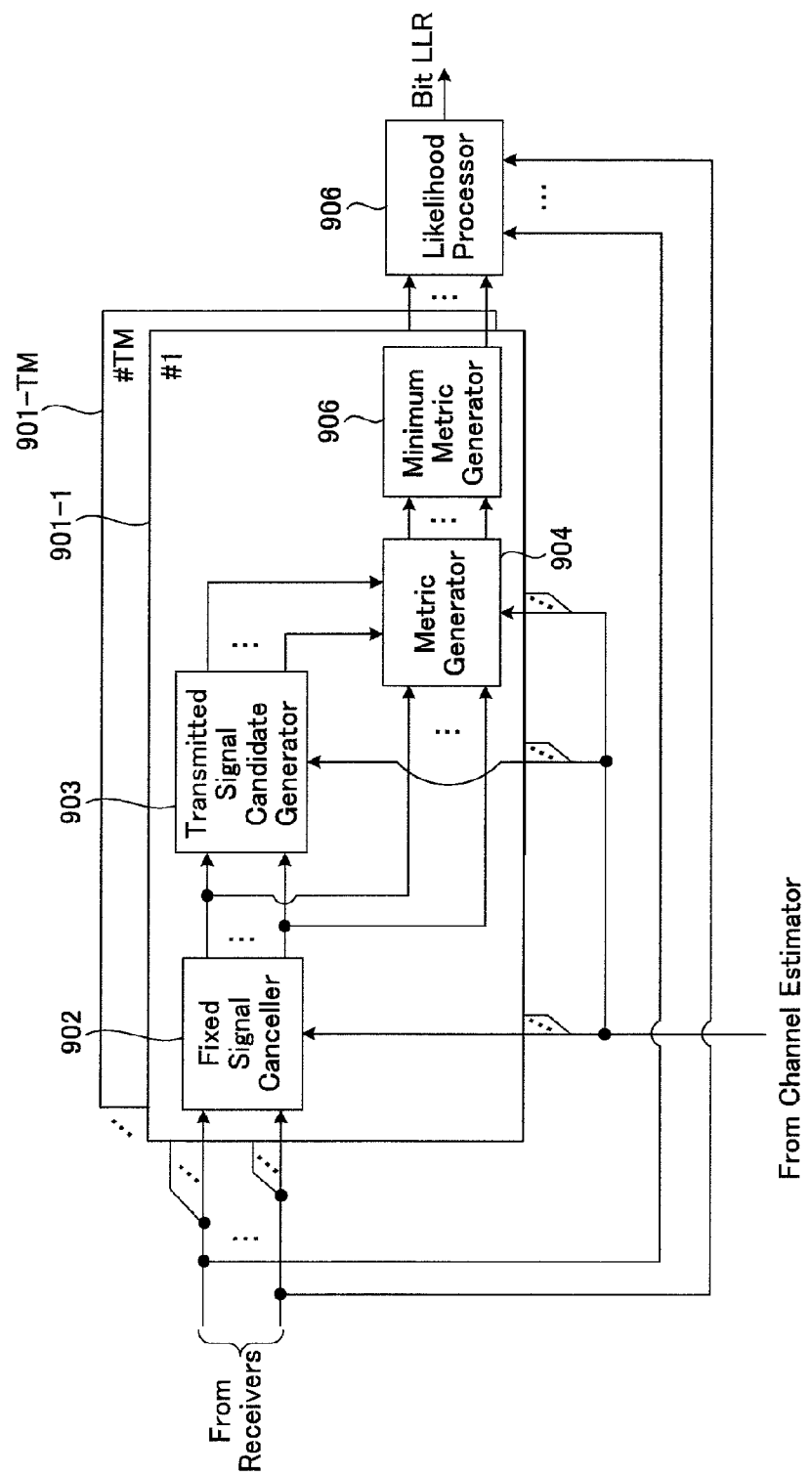
FIG. 12 is a block diagram showing a configuration of a signal detector in the fifth embodiment.

FIG. 12 is a block diagram showing a configuration of a signal detector in the fifth embodiment. The signal detector includes approximate metric generators 901-1 to 901-TM and a likelihood processor 906. Approximate metric generators 901-1 to 901-TM each include a fixed signal canceller 902, a transmitted signal candidate generator 903, a metric generator 904 and a minimum metric generator 905.

First, the received signal input through the receivers is supplied to approximate metric generators 901-1 to 901-TM. Each of the approximate metric generators 901-1 to 901-TM removes an associated fixed signal from the received signal through fixed signal canceller 902. Transmitted signal candidate generator 903 generates candidates of the transmitted signal for the signals after removal of fixed signals. Metric generator 904 calculates metrics based on the generated transmitted signal candidates, the signals after removal of fixed signals and the channel-estimated values input from the channel estimator. Minimum metric 905 outputs the minimum among the metrics obtained from metric generator 904. Likelihood processor 906 determines the maximum likelihood sequence based on the metrics output from approximate metric generators 901-1 to 901-TM, and calculates bit LLRs using the metric of the maximum likelihood sequence and the metric of the inverted bits of the maximum likelihood sequence.

Next, details of fixed signal canceller 902 will be described. First, equation (21) is expressed anew as follows: —

[Math 29]

$$\bar{s}_{t,m} = [0\nabla 0 \hat{s}_{t,m} 0 \nabla 0]^T \quad (26).$$

In the fifth embodiment, since the maximum likelihood sequence is not determined first unlike the fourth embodiment, it is necessary to consider M possible ways, instead of considering inverted bits only. There are four possible ways in the case of QPSK. There are sixteen possible ways in the case of 16QAM. Fixed signal canceller 902 prepares the signal for fixing:

[Math 30]

$$H\bar{s}_{t,m},$$

using equation (26) and remove the fixing signal from the received signal.

[Math 31]

$$\bar{y}_{t,m} = y - H\bar{s}_{t,m} \quad (27).$$

Since there are TM pieces of

[Math 32]

$$\bar{s}_{t,m},$$

TM pieces of

[Math 33]

$$\bar{y}_{t,m}$$

are generated.

Figure 13:
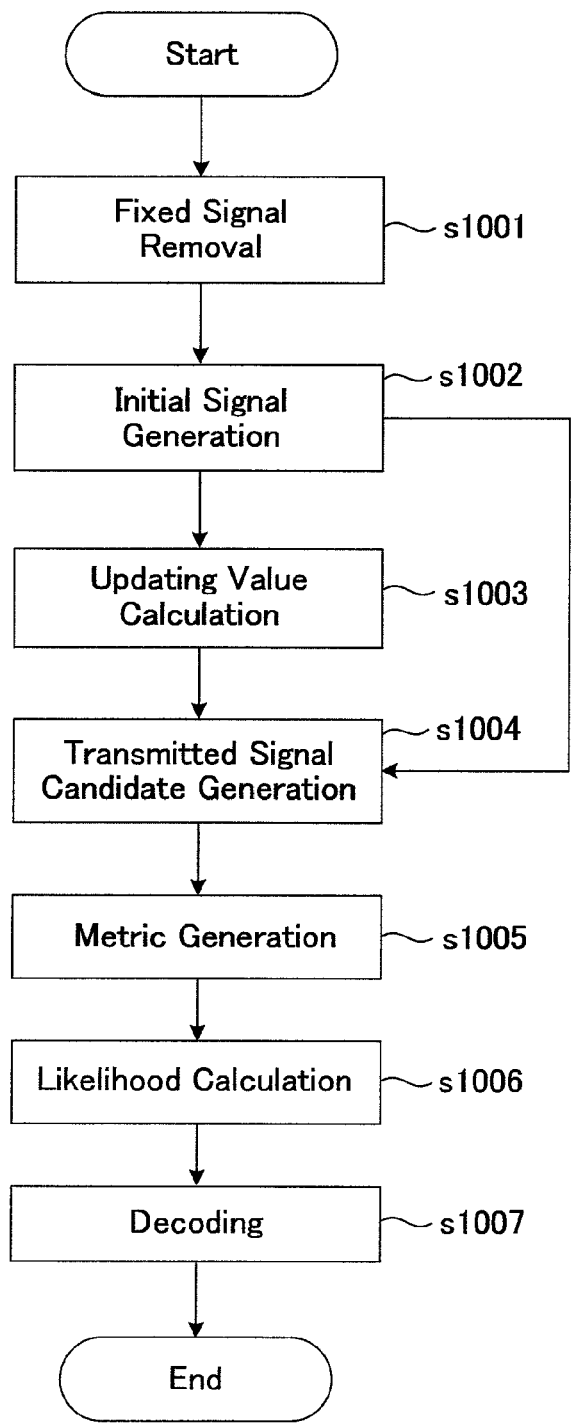
FIG. 13 is a flow chart for a receiving process in the fifth embodiment.

FIG. 13 is a flow chart for the receiving process in the fifth embodiment. First, at Step s1001 a transmitted signal transmitted from a certain transmitting antenna is fixed, then the fixed signal is removed from the received signal☐ At Step s1002, the signal in which the fixed signal has been removed is subjected to MMSE or ZF so as to generate an initial signal. At Step s1003, the updating value in the noise enhancement direction is calculated. At Step s1004 transmitted signal candidates for the signal in which the fixed signal has been removed are generated based on the initial signal and the updating value. At Step s1005, the metric for each transmitted signal candidate is calculated. At Step s1006, the maximum likelihood sequence and its bit LLRs are calculated based on the metrics generated at Step s1005. At Step s1007, error correction decoding is performed, and the transmission bit sequence is output to complete the process.

As above, the fifth embodiment is configured such that the metric for every bit is calculated instead of calculating the metrics for the inverted bits only. Since the maximum likelihood sequence is not determined first, the configuration is advantageous in performing the processes of metric calculation in parallel.

Embodiment 6

In the sixth embodiment, MIMO detection is repeatedly done using error correction decoding result.

Figure 14:
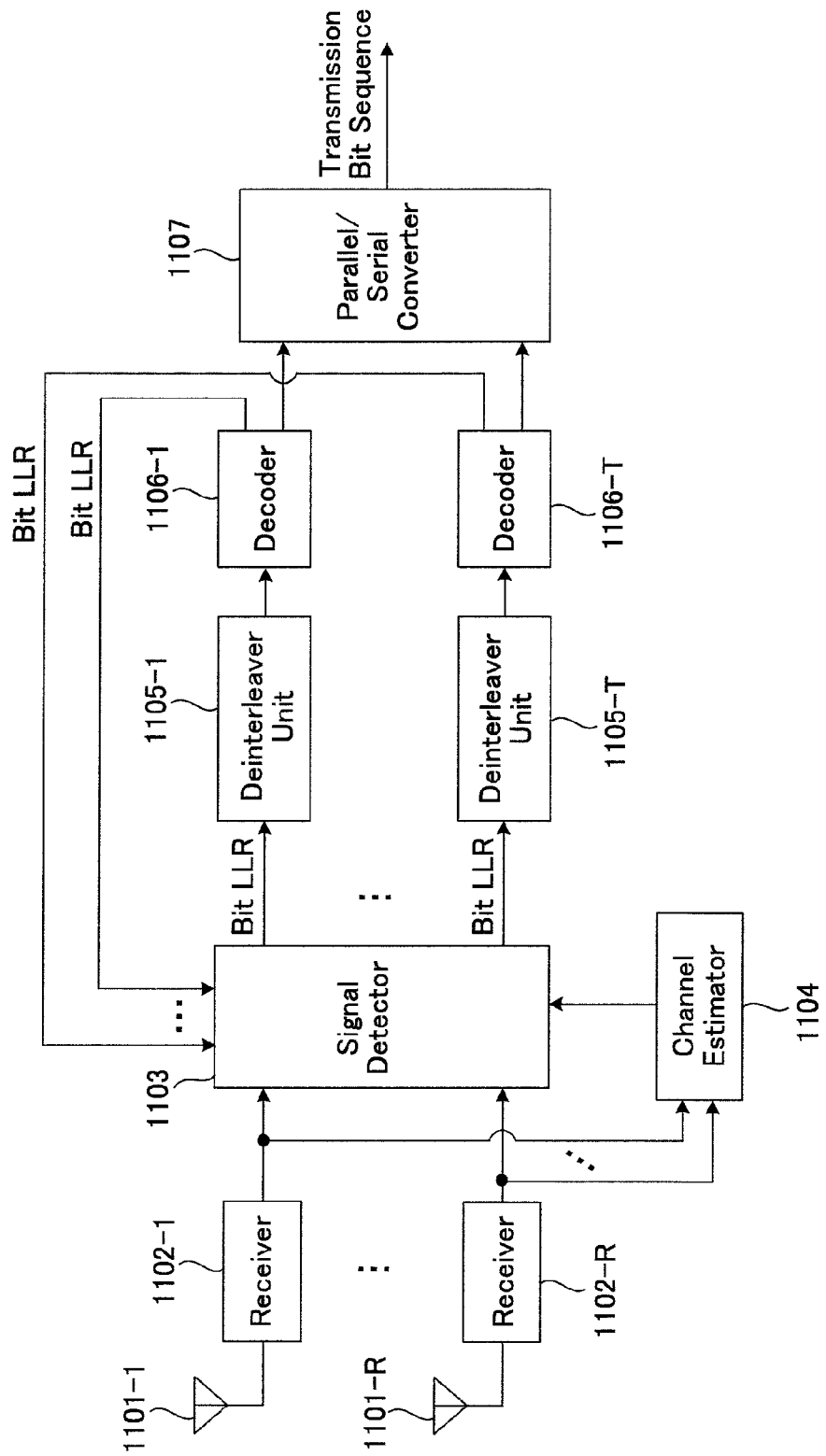
FIG. 14 is a block diagram showing a configuration of a receiving apparatus in the sixth embodiment.

FIG. 14 is a block diagram showing a configuration of a receiving apparatus in the sixth embodiment. The receiving apparatus includes receiving antennas 1101-1 to 1101-R, receivers 1102-1 to 1102-R, a signal detector 1103, a channel estimator 1104, deinterleaver units 1105-1 to 1105-T, decoders 1106-1 to 1106-T and a parallel-to-serial converter 1107.

The received waves picked up by receiving antennas 1101-1 to 1101-R are converted from the radio frequency to baseband signals by associated receivers 1102-1 to 1102R and output as the received signal. Signal detector 1103 performs MIMO signal detection based on the received signal and the bit LLRs obtained from decoders 1106-1 to 1106-T and channel-estimated values obtained from channel estimator 1104. The bit LLRs are rearranged through deinterleaver units 1105-1 to 1105T in the pattern opposite to the pattern in which interleaving was performed on the transmission side, and then subjected to error correction decoding through decoders 1106-1 to 1106-T.

If no error is found in the error correction decoded result, the bit sequences obtained by decoding are parallel-to-serial converted by parallel-to-serial converter 1107 to output the transmission bit sequence. If any error is found in the decoded result, the bit LLRs obtained by error correction decoding are input to signal detector 1103. Error detection of the decoded result may use CRC (Cyclic Redundancy Check), for example. Here, since no bit LLR is calculated if no decoding process has been performed, the processing of signal detector 1103 is performed without using any bit LLR.

Figure 15:
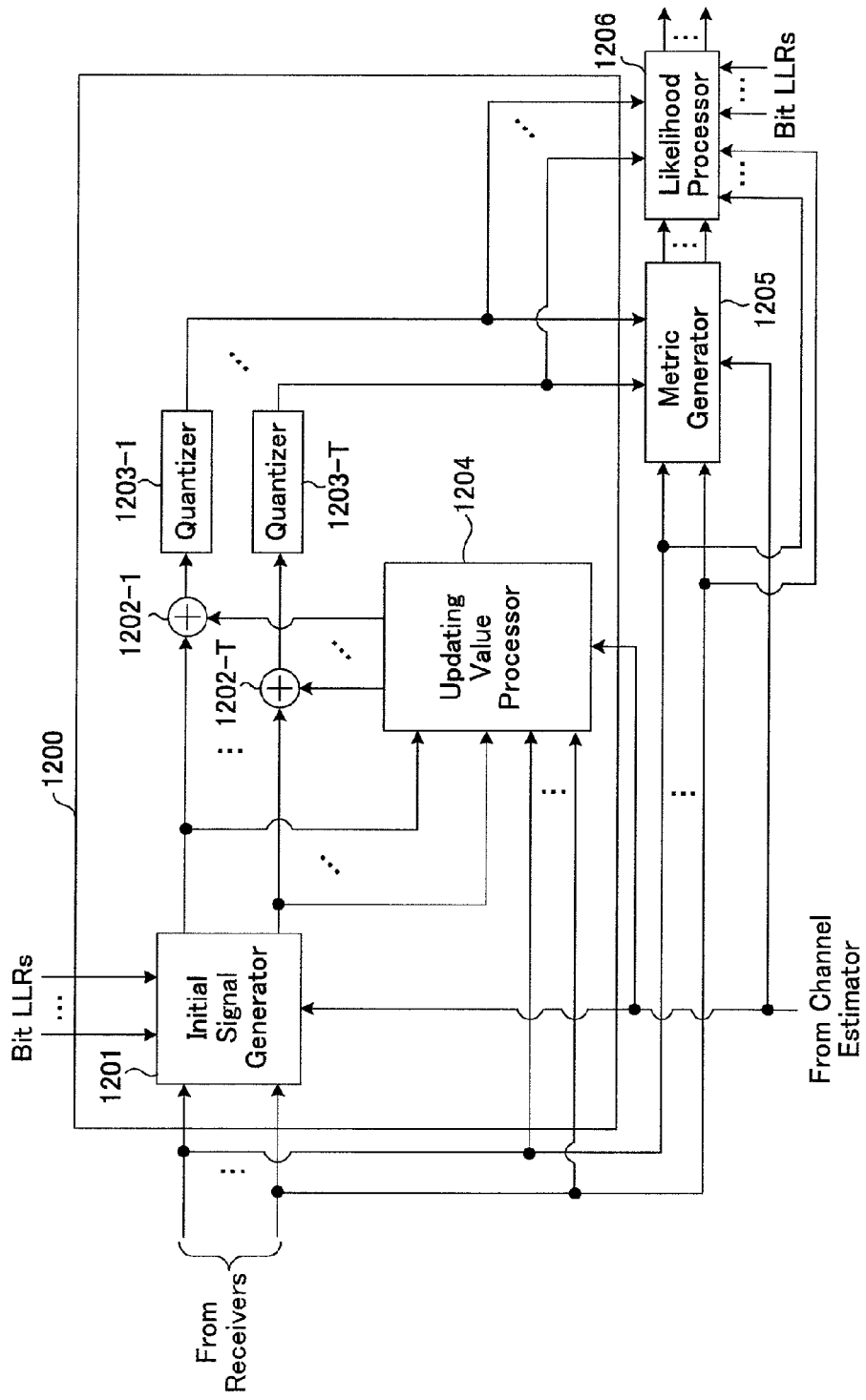
FIG. 15 is a block diagram showing a configuration of a signal detector in the sixth embodiment.

Details of signal detector 1103 when using bit LLRs will be described. FIG. 15 is a block diagram showing a configuration of a signal detector 1103. Signal detector 1103 includes a transmitted signal candidate generator 1200, a metric generator 1205 and a likelihood processor 1206. Transmitted signal candidate generator 1200 includes an initial signal generator 1201, adders 1202-1 to 1202-T, quantizers 1203-1 to 1203-T and an updating value processor 1204.

The blocks used for bit LLRs in FIG. 15 are initial signal generator 1201 and likelihood processor 1206. The other blocks are the same as those described in the first to fifth embodiments, so that detailed description is omitted.

Figure 16:
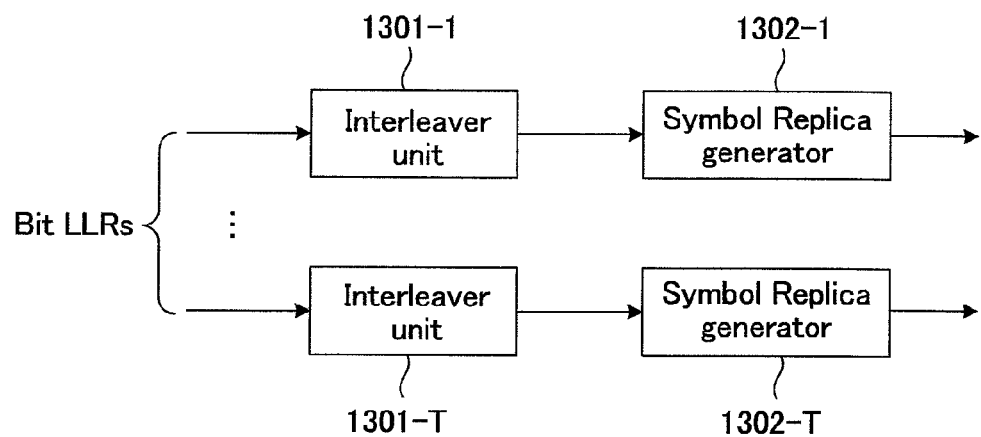
FIG. 16 is a block diagram showing a configuration of an initial signal generator in the sixth embodiment.

Details of initial signal generator 1201 will be described. Initial signal generator 1201 when bit LLRs output from decoders 1106-1 to 1106-T is used can generate the initial signal using bit LLRs only without use of the received signal. FIG. 16 is a block diagram showing a configuration of initial signal generator 1201. Initial signal generator 1201 includes interleaver units 1301-1 to 1301-T and symbol replica generators 1302-1 to 1302-T. Bit LLRs are interleaved by interleaver units 1301-1 to 1301-T in the same pattern as that on the transmitting side. Symbol replica generators 1302-1 to 1302-T generate symbol replicas of the modulation scheme performed on the transmitting side, from the interleaved bit LLRs, to thereby generate transmitted signal replicas, and output the transmitted replicas as the initial signal. For example, when the modulation scheme is QPSK, symbol replica generators 1302-1 to 1302-T perform the following process.

When the bit LLRs forming QPSK modulation symbols are λ(b$_0$) and λ(b$_1$), the replica of the QPSK modulation symbols is generated as

[Math 34]

$$\frac{1}{\sqrt{2}}\tanh(\lambda(b_0)/2) + \frac{j}{\sqrt{2}}\tanh(\lambda(b_1)/2). \quad (28)$$

Here, j represents the imaginary unit. Likelihood processor 1206, using the metrics generated by metric generator 1205 and the bit LLRs output from decoders 1106-1 to 1106-T, determines bit LLRs to be input to decoders 1106-1 to 1106-T. The bit LLR to be input to the decoder can be given by transforming equation (18) into equation (29), for example.

[Math 35]

$$\lambda_{t,n} = \min_{b+}\left[-\frac{\|y - \tilde{H}s_b\|^2}{\sigma_n^2} + \sum_{t' \neq t, n' \neq n} \log p(b_{t',n'})\right] + \quad (29)$$

$$\min_{b-}\left[-\frac{\|y - \tilde{H}s_b\|^2}{\sigma_n^2} + \sum_{t' \neq t, n' \neq n} \log p(b_{t',n'})\right] + \tilde{\lambda}_{t,n}$$

$$\lambda_{t,n} = -\frac{1}{\sigma_n^2}\min_{b+}\|y - \tilde{H}s_b\|^2 + \frac{1}{\sigma_n^2}\min_{b-}\|y - \tilde{H}s_b\|^2 + \tilde{\lambda}_{t,n} \quad (30)$$

Here, p(b$_{t,n}$) represents the possibility of occurrence of b$_{t,n}$. λ$_{t,n}$ represents the LLR for the n-th modulation bit of the bit LLR output from decoder 1106-t. As the approximate equation of equation (29), equation (30) can be used to determine the bit LLR. The bit LLR output from likelihood processor 1206 is input to decoders 1106-1 to 1106-T. This loop of error correction decoding and MIMO signal detection is ended when no error is detected or when a set number of decoding operation have been performed.

Figure 17:
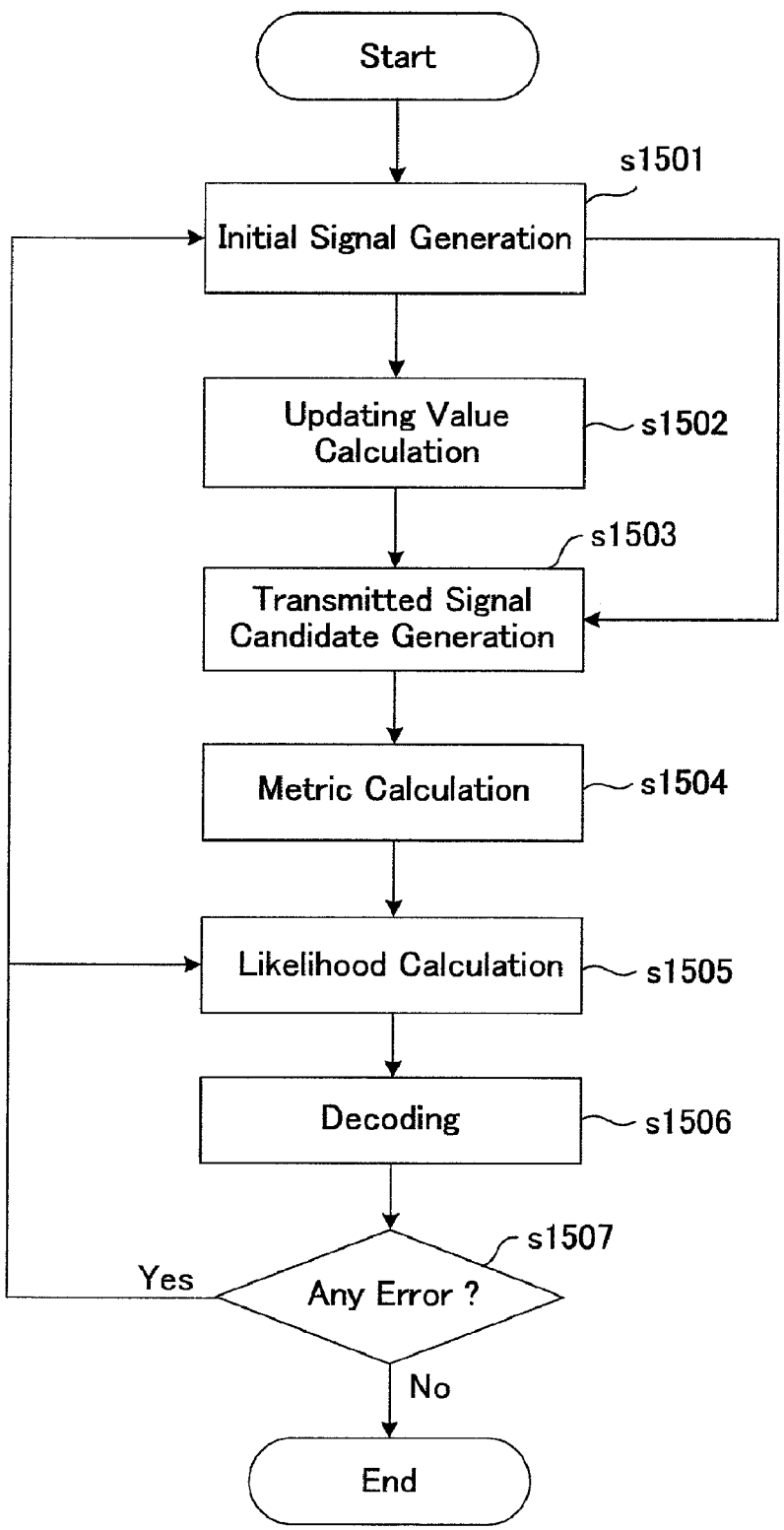
FIG. 17 is a flowchart for a receiving process in the sixth embodiment.
Figure 18:
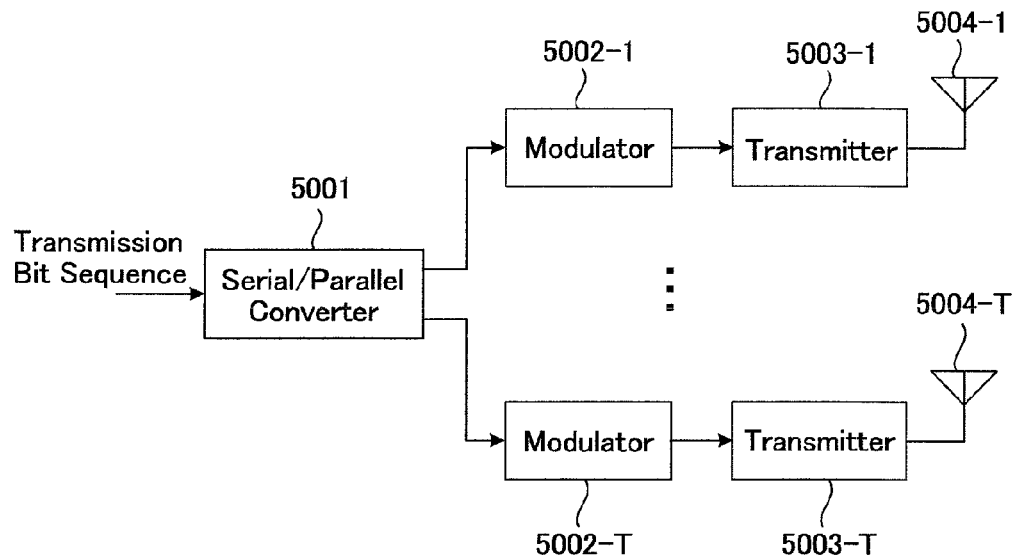
FIG. 18 is a block diagram showing a configuration of a conventional transmitting apparatus in MIMO transmission.
Figure 19:
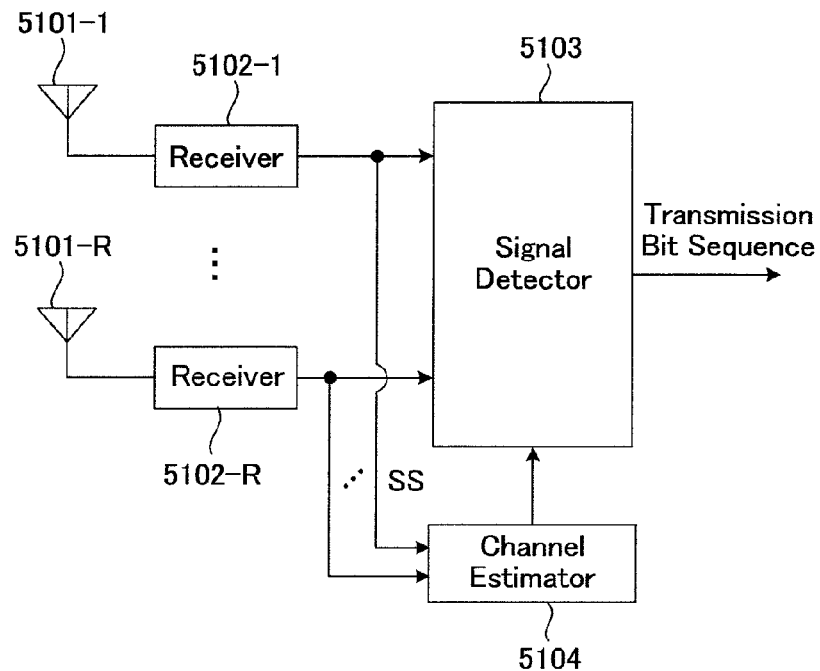
FIG. 19 is a block diagram showing a configuration of a conventional receiving apparatus in MIMO transmission.
Figure 20:
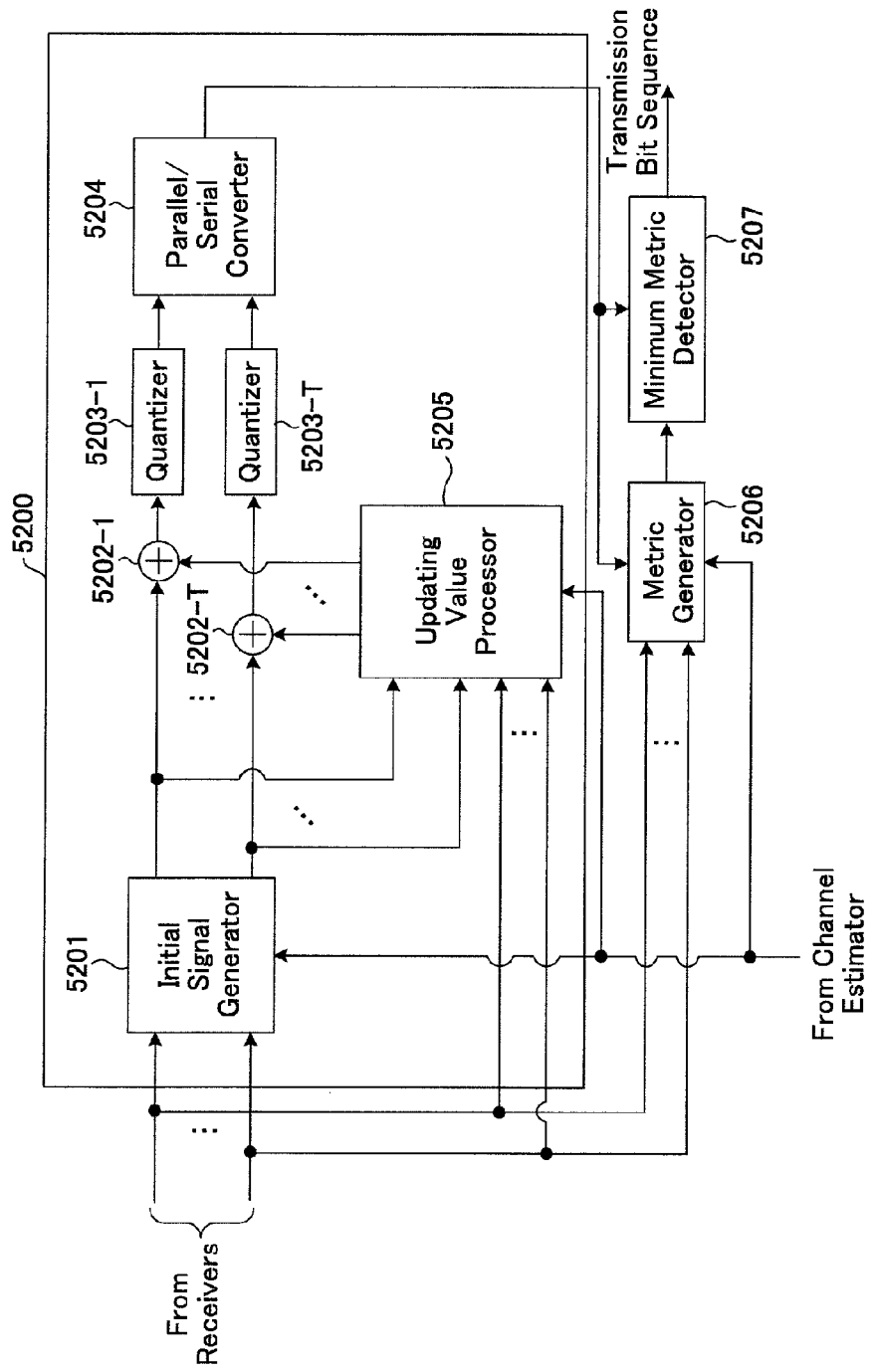
FIG. 20 is a block diagram showing a configuration of a signal detector 5103 shown in Patent Document 1.

FIG. 17 is a flow chart for the receiving process of the sixth embodiment. At Step s1501 an initial signal is generated. When no error correction decoding has been performed, an initial signal is determined from the received signal by MMSE or ZF. This initial signal is sent to Step s1502 and Step s1503. At Step s1502, a directional vector that indicates the direction of degradation due to noise enhancement and a step size for making a search in the direction of degradation are calculated based on the channel-estimated values, and updating value is calculated from the directional vector and the step size.

At Step s1503, the initial signal and the updating value are summed up, and the sum is subjected to hard decision so as to generate transmitted signal candidates. At Step s1504, the metric of each of the transmitted signal candidates generated at Step s1503 is calculated. At Step s1505, based on the metrics obtained at Step s1504, the maximum likelihood sequence and its bit LLRs are calculated. Since no decoding process has been performed at this point, no consideration is given for LLR calculation. At Step s1506, error correction decoding is performed for the bit LLRs obtained at Step s1505. At Step s1507, it is determined whether the decoded bit sequence includes any error. If it is determined that there is no error, the bit sequence is output and the process is ended. If it is determined that there is an error, the decoded bit LLR is sent to Steps s1501 and s1505, and the control returns once again to Step s1501.

At Step s1501 after once decoding has been performed, a replica of the modulation symbol is generated from the bit LLRs obtained by the decoding process, to thereby generate an initial signal. At Step s1502, based on the generated initial signal, a step size for making a search in the direction of degradation is determined, and updating value is calculated from the initially determined directional vector and step size. At Step s1503, the initial signal and the updating value are summed up, and the sum is subjected to hard decision so as to generate transmitted signal candidates. At Step s1504, the metric of each of the transmitted signal candidates is calculated. At Step s1505, based on the metrics obtained at Step s1504 and the bit LLRs of the decoded result, the bit LLRs of the maximum likelihood sequence are determined. At Step s1506, error correction decoding process for the bit LLRs is performed. If there is any error in the decoded result, the control returns to Step s1501 once again, and the same process is carried out.

As above, since in the sixth embodiment MIMO signal detection and decoding process are repeatedly performed, it is possible to efficiently improve both the MIMO signal detection performance and the decoding process performance.

Though the sixth embodiment was illustrated taking a case where the bit LLRs output from decoders 1106-1 to 1106-T are used in both initial signal generator 1201 and likelihood processor 1206, the bit LLRs need not to be necessarily used in both, but it is possible to give a configuration in which the bit LLRs are used in initial signal generator 1201 while the bit LLRs are not used in likelihood processor 1206. Alternatively, it is also possible to give a configuration in which the bit LLRs are not used in initial signal generator 1201 while the bit LLRs are used in likelihood processor 1206. When the bit LLRs are not used in initial signal generator 1201, the initially generated initial signal can be determined using MMSE or the like.

Though in the sixth embodiment, the receiving apparatus of the second embodiment is extended so that the bit LLRs output from the decoders are used, it is also possible to extend the third to fifth embodiments in the same way so that the bit LLRs output from the decoders are used.

Further, though the above embodiments were described on the assumption that each of transmitting antennas transmits different data from the others, the present invention should not be limited to this, but may also include cases in which the same data is transmitted from part of the plurality of transmitting antennas being used. In this case, it works if different pieces of data being transmitted are detected on the receiving side.

Though the above embodiments were illustrated with regard to a narrow bandwidth single carrier MIMO system, the present invention should not be limited to this. For example, the invention can be similarly applied to multicarrier systems such as MIMO-OFDM (Octagonal Frequency Division Multiplexing) and MIMO-MC-CDMA (Multi Carrier-Code Division Multiple Access) as well as to a single carrier system in which MIMO signals are separated in the frequency domain. When MIMO signal separation is performed in frequency domain, if the received signal may be transformed into frequency domain by, for example Fourier transform, narrow-bandwidth MIMO signals that are independent at different frequencies appear, hence can be readily applied to the above first to sixth embodiments.

The invention claimed is:

1. A receiving apparatus for performing communication in a MIMO system, comprising:
    a channel estimator for calculating a channel-estimated value;

a signal detector for calculating a bit log likelihood ratio of a transmitted signal from a received signal; and, a decoder for performing an error correction decoding process for the bit log likelihood ratio, wherein the signal detector includes:

a transmitted signal candidate generator for generating transmitted signal candidates;

a metric generator for generating metrics with regard to the transmitted signal candidates; and, a likelihood processor for determining the transmitted signal candidate producing the minimum metric among the metrics, as the maximum likelihood sequence and calculating the bit log likelihood ratio for the maximum likelihood sequence, the transmitted signal candidate generator includes:

an initial signal generator for generating an initial signal;

an updating value processor for determining an updating value for the initial signal;

an adder for summing up the initial signal and the updating value; and a quantizer for performing a hard-decision of the sum from the adder to generate the transmitted signal candidates, and, the updating value processor includes:

a search direction generator for calculating a direction in which reception performance degrades, at least based on the channel-estimated value;

a step size generator for calculating a step size based on the initial signal and the direction in which the reception performance degrades; and, an updating value generator for calculating the updating value from the direction in which the reception performance degrades and the step size.

2. The receiving apparatus according to claim 1, wherein the initial signal generator, generates the initial signal by multiplying the received signal with an weight coefficient that is calculated from the channel-estimated value, or generates a transmitted signal replica from the bit log likelihood ratio output from the decoder and sets the replica as the initial signal.

3. The receiving apparatus according to claim 2, wherein the search direction generator calculates at least one direction that indicates noise enhancement as the direction in which the reception performance degrades, based on the weight coefficient.

4. The receiving apparatus according to claim 3, wherein the search direction generator calculates at least one direction that indicates the noise enhancement, by the power method.

5. The receiving apparatus according to claim 3, wherein the search direction generator further makes hard decision of the initial signal and calculates the direction indicating the noise enhancement based on a gradient of the metric of the hard-decision result.

6. The receiving apparatus according to claim 1, wherein the likelihood processor determines the bit log likelihood ratio, by further taking the bit log likelihood ratio output from the decoder into consideration.

7. The receiving apparatus according to claim 1, wherein the step size generator generates the step size so that the initial signal will be updated to a different hard-decision region.

8. The receiving apparatus according to claim 1, wherein the likelihood processor generates a simplified metric from the step size and determines an inverted bit sequence of the maximum likelihood sequence that produces the minimum simplified metric, and calculates the bit log likelihood ratio from the inverted bit sequence and the metric of the maximum likelihood sequence.

9. The receiving apparatus according to claim 1, wherein the likelihood processor includes:

a fixed signal canceller for removing a signal including an inverted bit for the maximum likelihood sequence;

a transmitted signal candidate generator for generating transmitted signal candidates for an output from the fixed signal canceller;

a metric generator for generating metrics for the transmitted signal candidates; and, a likelihood calculator that determines the minimum metric among the metrics as the metric of the inverted bit and calculates the bit log likelihood ratio from the metric of the inverted bit and the metric of the maximum likelihood sequence.

10. A receiving apparatus for performing communication in a MIMO system, comprising:

a channel estimator for calculating a channel-estimated value;

a signal detector for calculating a bit log likelihood ratio of a transmitted signal from a received signal; and, a decoder for performing an error correction decoding process for the bit log likelihood ratio, wherein the signal detector includes:

an approximate metric generator; and a likelihood processor, the approximate metric generator includes:

a fixed signal canceller for removing a modulation signal fixed at a certain transmitting antenna;

a transmitted signal candidate generator for generating transmitted signal candidates for an output from the fixed signal canceller;

a metric generator for calculating the metrics for the transmitted signal candidates; and a minimum metric generator for determining the minimum metric among the metrics, the likelihood processor calculates a bit log likelihood ratio of the maximum likelihood sequence from the metric output from the approximate metric generator, the transmitted signal candidate generator includes:

an initial signal generator for generating an initial signal;

an updating value processor for determining an updating value for the initial signal;

an adder for summing up the initial signal and the updating value; and a quantizer for performing hard-decision of the sum from the adder to generate the transmitted signal candidates, and, the updating value processor includes:

a search direction generator for calculating a direction in which reception performance degrades, at least based on the channel-estimated value;

a step size generator for calculating a step size based on the initial signal and the direction in which the reception performance degrades; and, an updating value generator for calculating the updating value from the direction in which the reception performance degrades and the step size.

11. The receiving apparatus according to claim 10, wherein the initial signal generator, generates the initial signal by multiplying the received signal with an weight coefficient that is calculated from the channel-estimated value, or generates a transmitted signal replica from a bit log likelihood ratio output from the decoder and sets the replica as the initial signal.

12. The receiving apparatus according to claim 10, wherein the search direction generator calculates a direction that indicates the greatest noise enhancement based on the weight coefficient, by using the power method.

13. The receiving apparatus according to claim 10, wherein the search direction generator makes a hard decision of the initial signal and calculates the noise enhanced direction based on a gradient of the metric of the hard-decision result.

14. The receiving apparatus according to claim 10, wherein the likelihood processor determines the bit log likelihood ratio, by further taking the bit log likelihood ratio output from the decoder into consideration.

15. A receiving method in a receiving apparatus for performing communication in a MIMO system, comprising:
a channel estimating step of calculating a channel-estimated value by channel estimating portion;
a signal detecting step of calculating a bit log likelihood ratio of a transmitted signal from a received signal by signal detecting portion; and
a decoding step of performing an error correction decoding process for the bit log likelihood ratio by decoding portion;
wherein
the signal detecting step includes:
a transmitted signal candidate generating step of generating transmitted signal candidates;
a metric generating step of generating metrics with regard to the transmitted signal candidates; and,
a likelihood processing step of determining a transmitted signal candidate producing the minimum metric among the metrics, as the maximum likelihood sequence and calculating a bit log likelihood ratio for the maximum likelihood sequence,
the transmitted signal candidate generating step includes:
an initial signal generating step of generating an initial signal;
an updating value processing step of determining an updating value for the initial signal;
an adding step of summing up the initial signal and the updating value; and
a quantizing step of performing a hard-decision of the sum from the adder to generate the transmitted signal candidates, and,
the updating value processing step includes:
a search direction generating step of calculating a noise enhanced direction at least based on the channel-estimated value;
a step size generating step of calculating a step size based on the initial signal and the noise enhanced direction; and,
an updating value generating step of calculating the updating value from the noise enhancement vector and step size.

16. A receiving method in a receiving apparatus for performing communication in a MIMO system, comprising:
a channel estimating step of calculating a channel-estimated value by channel estimating portion;
a signal detecting step of calculating a bit log likelihood ratio of a transmitted signal from a received signal by signal detecting portion; and
a decoding step of performing an error correction decoding process for the bit log likelihood ratio by decoding portion;
wherein
the signal detecting step includes:
an approximate metric generating step; and
a likelihood processing step,
the approximate metric generating step includes:
a fixed signal canceling step of removing a modulation signal fixed at a certain transmitting antenna;
a transmitted signal candidate generating step of generating transmitted signal candidates for an output from the fixed signal canceling portion;
a metric generating step of calculating metrics for the transmitted signal candidates; and
a minimum metric generating step of determining the minimum metric among the metrics,
the likelihood processing step calculates a bit log likelihood ratio of the maximum likelihood sequence from the metrics output from the approximate metric generating portion,
the transmitted signal candidate generating step includes:
an initial signal generating step of generating an initial signal;
an updating value processing step of determining an updating value for the initial signal;
an adding step of summing up the initial signal and the updating value; and
a quantizing step of performing a hard-decision of the sum in the adding step to generate the transmitted signal candidates, and,
the updating value processing step includes:
a search direction generating step of calculating a noise enhanced direction at least based on the channel-estimated value;
a step size generating step of calculating a step size based on the initial signal and the noise enhanced direction; and,
an updating value generating step of calculating the updating value from the noise enhancement vector and step size.

17. A communication system including a transmitting apparatus and a receiving apparatus for performing communication in a MIMO system,
wherein
the transmitting apparatus transmits at least two data different from each other from a plurality of transmitting antennas, and
the receiving apparatus includes:
a channel estimator for calculating a channel-estimated value;
a signal detector for calculating a bit log likelihood ratio of a transmitted signal from a received signal; and,
a decoder for performing an error correction decoding process for the bit log likelihood ratio to determine data transmitted from the transmitting apparatus,
the signal detector includes:
a transmitted signal candidate generator for generating transmitted signal candidates;
a metric generator for generating metrics with regard to the transmitted signal candidates; and,
a likelihood processor for determining a transmitted signal candidate producing the minimum metric among the metrics, as the maximum likelihood sequence and calculating a bit log likelihood ratio for the maximum likelihood sequence,
the transmitted signal candidate generator includes:
an initial signal generator for generating an initial signal;
an updating value processor for determining an updating value for the initial signal;

an adder for summing up the initial signal and the updating value; and
a quantizer for performing a hard-decision of the sum from the adder to generate the transmitted signal candidates, and,
the updating value processor includes:
a search direction generator for calculating a noise enhanced direction, at least, based on the channel-estimated value;
a step size generator for calculating a step size based on the initial signal and the noise enhanced direction; and,
an updating value generator for calculating the updating value from the noise enhancement vector and the step size.

18. A communication system including a transmitting apparatus and a receiving apparatus for performing communication in a MIMO system,
wherein
the transmitting apparatus transmits at least two data different from each other from a plurality of transmitting antennas, and
the receiving apparatus includes:
a channel estimator for calculating a channel-estimated value;
a signal detector for calculating a bit log likelihood ratio of a transmitted signal from a received signal; and,
a decoder for performing an error correction decoding process for the bit log likelihood ratio to determine data transmitted from the transmitting apparatus,
the signal detector includes:
an approximate metric generator; and
a likelihood processor,
the approximate metric generator includes:
a fixed signal canceller for removing a modulation signal fixed at a certain transmitting antenna;
a transmitted signal candidate generator for generating transmitted signal candidates for an output from the fixed signal canceller;
a metric generator for calculating the metrics for the transmitted signal candidates; and
a minimum metric generator for determining the minimum metric among the metrics,
the likelihood processor calculates a bit log likelihood ratio of the maximum likelihood sequence from a metric output from the approximate metric generator,
the transmitted signal candidate generator includes:
an initial signal generator for generating an initial signal;
an updating value processor for determining an updating value for the initial signal;
an adder for summing up the initial signal and the updating value; and
a quantizer for performing a hard-decision of the sum from the adder to generate the transmitted signal candidates, and,
the updating value processor includes:
a search direction generator for calculating a noise enhanced direction, at least, based on the channel-estimated value;
a step size generator for calculating a step size based on the initial signal and the noise enhanced direction; and,
an updating value generator for calculating the updating value from the noise enhancement vector and the step size.

* * * * *